United States Patent
Kimura

(10) Patent No.: US 12,072,187 B2
(45) Date of Patent: Aug. 27, 2024

(54) ROTATION ANGLE DETECTION DEVICE

(71) Applicant: HITACHI ASTEMO, LTD., Hitachinaka (JP)

(72) Inventor: Makoto Kimura, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 82 days.

(21) Appl. No.: 17/799,814

(22) PCT Filed: Feb. 10, 2021

(86) PCT No.: PCT/JP2021/004901
§ 371 (c)(1),
(2) Date: Aug. 15, 2022

(87) PCT Pub. No.: WO2021/166754
PCT Pub. Date: Aug. 26, 2021

(65) Prior Publication Data
US 2023/0093616 A1    Mar. 23, 2023

(30) Foreign Application Priority Data

Feb. 17, 2020    (JP) ................................. 2020-024049

(51) Int. Cl.
*G01B 7/30*    (2006.01)
*B62D 5/04*    (2006.01)

(52) U.S. Cl.
CPC ............. *G01B 7/30* (2013.01); *B62D 5/0481* (2013.01)

(58) Field of Classification Search
CPC .................................. G01B 7/30; B62D 5/0481
See application file for complete search history.

(56) References Cited

U.S. PATENT DOCUMENTS

| 9,182,452 B2 * | 11/2015 | Kimura | G01R 31/40 |
| 11,271,515 B2 * | 3/2022 | Kimura | H02M 1/325 |

(Continued)

FOREIGN PATENT DOCUMENTS

JP    2016-205948 A    12/2016

OTHER PUBLICATIONS

International Preliminary Report on Patentability dated Aug. 23, 2022 issued in International Application No. PCT/JP2021/004901 by the International Bureau, with English translation, 10 pages.

(Continued)

*Primary Examiner* — Reena Aurora
(74) *Attorney, Agent, or Firm* — FOLEY & LARDNER LLP

(57) ABSTRACT

The present invention provides a rotation angle detection device that detects a steering state quantity of steer-by-wire. The rotation angle detection device includes a drive gear that rotates along with the rotation of a rotating shaft part, first through third driven gears that rotate in conjunction with the drive gear and have different numbers of teeth that are indivisible by each other, sensors that detect the amounts of rotation and are provided for the respective first through third driving gears, a rotation amount generating unit that generates the amount of rotation of the drive gear by combining the amounts of rotation of different driven gears, and power supply circuits each of which is provided for a combination of sensors that detect the amounts of rotation of different driven gears. This configuration makes it possible to improve robustness against failure of sensor elements and power supply circuits.

17 Claims, 22 Drawing Sheets

VEHICLE FORWARD DIRECTION

(56) References Cited

U.S. PATENT DOCUMENTS

2006/0037806 A1* 2/2006 Kasahara ............... B62D 6/008
                                                    180/402
2014/0172236 A1* 6/2014 Nishikawa ............ B62D 5/003
                                                    701/42

OTHER PUBLICATIONS

International Search Report dated Apr. 27, 2021 issued in International Application No. PCT/JP2021/004901, with English translation, 6 pages.

* cited by examiner

VEHICLE FORWARD DIRECTION

FIG.14

|  | θ 27a | θ 27b | θ 30a | θ 30b | θ 33a | θ 33b |
|---|---|---|---|---|---|---|
| θ 27a |  | — | — | — | — | — |
| θ 27b | — |  | — | — | — | — |
| θ 30a | ○ | ○ |  | — | — | — |
| θ 30b | ○ | ○ | — |  | — | — |
| θ 33a | ○ | ○ | ○ | ○ |  | — |
| θ 33b | ○ | ○ | ○ | ○ | — |  |

FIG.15

|  | θ 27a | θ 27b | ~~θ 30a~~ | θ 30b | ~~θ 33a~~ | θ 33b |
|---|---|---|---|---|---|---|
| θ 27a |  | — | — | — | — | — |
| θ 27b | — |  | — | — | — | — |
| ~~θ 30a~~ | × | × |  | — | — | — |
| θ 30b | ○ | ○ | — |  | — | — |
| ~~θ 33a~~ | × | × | × | × |  | — |
| θ 33b | ○ | ○ | × | ○ | — |  |

FIG.16

|  | $\theta 27a$ | $\cancel{\theta 27b}$ | $\theta 30a$ | $\cancel{\theta 30b}$ | $\theta 33a$ | $\theta 33b$ |
|---|---|---|---|---|---|---|
| $\theta 27a$ |  | — | — | — | — | — |
| $\cancel{\theta 27b}$ | — |  | — | — | — | — |
| $\theta 30a$ | ○ | × |  | — | — | — |
| $\cancel{\theta 30b}$ | × | × | — |  | — | — |
| $\theta 33a$ | ○ | × | ○ | × |  | — |
| $\theta 33b$ | ○ | × | ○ | × | — |  |

FIG.17

|  | $\cancel{\theta 27a}$ | $\theta 27b$ | $\theta 30a$ | $\theta 30b$ | $\theta 33a$ | $\cancel{\theta 33b}$ |
|---|---|---|---|---|---|---|
| $\cancel{\theta 27a}$ |  | — | — | — | — | — |
| $\theta 27b$ | — |  | — | — | — | — |
| $\theta 30a$ | × | ○ |  | — | — | — |
| $\theta 30b$ | × | ○ | — |  | — | — |
| $\theta 33a$ | × | ○ | ○ | ○ |  | — |
| $\cancel{\theta 33b}$ | × | × | × | × | — |  |

ROTATION ANGLE DETECTION DEVICE

TECHNICAL FIELD

The present invention relates to a rotation angle detection device that detects a steering state quantity of steer-by-wire.

BACKGROUND ART

A rotation angle detection device described in Patent Document 1 includes a drive gear that rotates along with the rotation of a rotating body where rotation is detected, multiple driven gears that rotate in conjunction with the drive gear, multiple sensors corresponding to the respective driven gears, and a processing unit that calculates the rotation angle of the drive gear based on output signals from the multiple sensors. The driven gears include a first driven gear, a second driven gear, and a third driven gear; and the sensors include a first sensor, a second sensor, and a third sensor that correspond to the three driven gears, respectively. The first, second, and third sensors output signals with different output waveforms; and the processing unit calculates the rotation angle of the drive gear based on the combination of the three output signals from the first, second, and third sensors.

REFERENCE DOCUMENT LIST

Patent Document

Patent Document 1: JP 2016-205948 A

SUMMARY OF THE INVENTION

Problem to be Solved by the Invention

Here, in a steer-by-wire steering system, the rotation angle of a steering wheel provided in a steering input device is detected, the steering amount of tires (in other words, steered road wheels) connected to a steering device is detected as a rotation angle, and the steering device is driven and controlled based on the detection results of the rotation angles.

Therefore, when the amount of rotation of the steering wheel or the steering amount of the tires is not detectable due to a failure of a sensor element for detecting the rotation angle or a failure of a power supply circuit for supplying power to the sensor element, steering control cannot be performed.

The present invention is made in view of the state of the related art, and its object is to provide a rotation angle detection device having high robustness against failures of sensor elements and power supply circuits.

Means for Solving the Problem

An aspect of the present invention provides a rotation angle detection device that detects a steering state quantity of steer-by-wire. The rotation angle detection device includes a rotating shaft part that rotates around a rotational axis; a rotation angle detector including a drive gear that rotates along with rotation of the rotating shaft part, a first driven gear, a second driven gear, and a third driven gear that rotate in conjunction with the drive gear, the numbers of teeth of the first driven gear, the second driven gear, and the third driven gear being different from each other and indivisible by each other, a first magnet provided on the first driven gear, a second magnet provided on the second driven gear, a third magnet provided on the third driven gear, a first sensor and a second sensor that are disposed to face the first magnet and detect an amount of rotation of the first driven gear, a third sensor and a fourth sensor that are disposed to face the second magnet and detect an amount of rotation of the second driven gear, and a fifth sensor and a sixth sensor that are disposed to face the third magnet and detect an amount of rotation of the third driven gear; and a control device that, based on an amount of rotation of the rotating shaft part, outputs a signal used to control the steer-by-wire. The control device includes a rotation amount generating unit that generates an amount of rotation of the drive gear based on detection values from a combination of sensors different from any one of a combination of the first sensor and the second sensor, a combination of the third sensor and the fourth sensor, and a combination of the fifth sensor and the sixth sensor; and a first power supply circuit, a second power supply circuit, and a third power supply circuit, each of which supplies power to one or more of the first sensor, the second sensor, the third sensor, the fourth sensor, the fifth sensor, and the sixth sensor. The first power supply circuit includes a first power supply that supplies power to a sensor among the first sensor, the second sensor, the third sensor, the fourth sensor, the fifth sensor, and the sixth sensor; and a second power supply that supplies power to a sensor that is different from the sensor to which power is supplied from the first power supply and detects the amount of rotation of a driven gear different from a driven gear the amount of rotation of which is detected by the sensor to which power is supplied from the first power supply. The second power supply circuit includes a third power supply that supplies power to a sensor among the first sensor, the second sensor, the third sensor, the fourth sensor, the fifth sensor, and the sixth sensor; and a fourth power supply that supplies power to a sensor that is different from the sensor to which power is supplied from the third power supply and detects the amount of rotation of a driven gear different from a driven gear, the amount of rotation of which is detected by the sensor to which power is supplied from the third power supply. The third power supply circuit includes a fifth power supply that supplies power to a sensor among the first sensor, the second sensor, the third sensor, the fourth sensor, the fifth sensor, and the sixth sensor; and a sixth power supply that supplies power to a sensor that is different from the sensor to which power is supplied from the first power supply and detects the amount of rotation of a driven gear different from a driven gear the amount of rotation of which is detected by the sensor to which power is supplied from the first power supply.

Effects of the Invention

The present invention makes it possible to improve robustness against failure of sensor elements and power supply circuits.

BRIEF DESCRIPTION OF THE DRAWINGS

FIG. 14 is a drawing showing combinations of angle signals usable for calculating absolute angles in a case in which all sensor power supply circuits are operating normally;

FIG. 15 is a drawing showing combinations of angle signals usable for calculating absolute angles in a case in which an angle signal θ30a and an angle signal θ33a indicate abnormal values due to a failure of a sensor power supply circuit;

FIG. 16 is a drawing showing combinations of angle signals usable for calculating absolute angles in a case in which an angle signal θ27b and an angle signal θ30b indicate abnormal values due to a failure of a sensor power supply circuit;

FIG. 17 is a drawing showing combinations of angle signals usable for calculating absolute angles in a case in which an angle signal θ27a and an angle signal θ33b indicate abnormal values due to a failure of a sensor power supply circuit;

MODES FOR CARRYING OUT THE INVENTION

A rotation angle detection device according to an embodiment of the present invention is described below with reference to the drawings.

Figure 1:
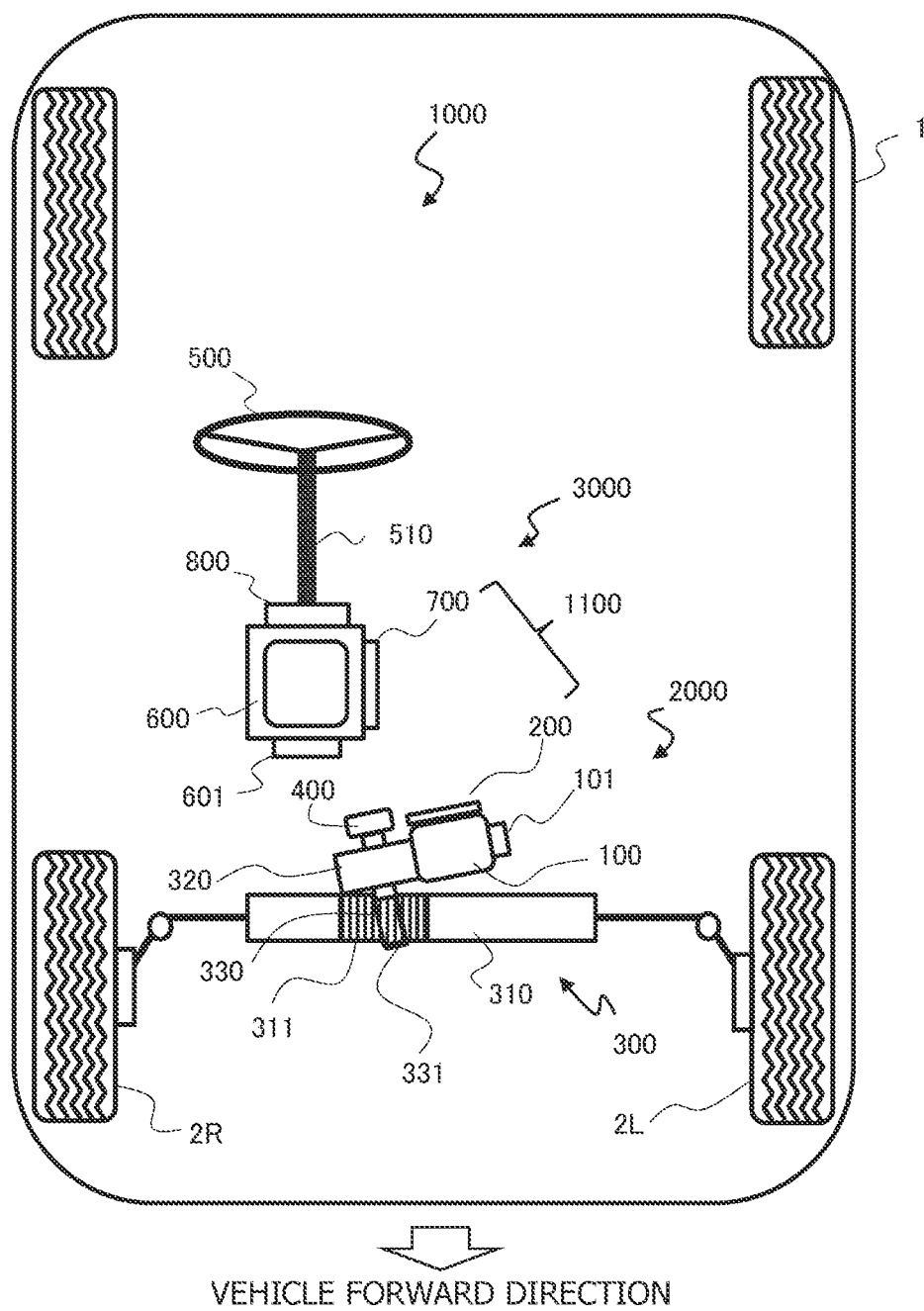
FIG. 1 is a drawing illustrating a configuration of a steer-by-wire steering system.

FIG. 1 is a drawing illustrating an embodiment of a steer-by-wire steering system 1000 provided in a vehicle 1 such as an automobile.

Steer-by-wire steering system 1000 controls the steering angle, in other words, the steering amount, of steered road wheels 2L and 2R that are front tires of vehicle 1. Steered road wheels 2L and 2R are mechanically separated from a steering wheel 500.

Steer-by-wire steering system 1000 includes a steering device 2000 and a steering input device 3000.

Steering device 2000 includes an electric motor 100 that functions as a steering actuator for generating steering force applied to steered road wheels 2L and 2R, a first electronic control unit (ECU) 200 that drives and controls electric motor 100, a steering mechanism 300, and a first rotation angle detection device 400 (in other words, a rotation angle detector) that detects the position (for example, a rack position) of steering mechanism 300 as an amount related to the steering amount of steered road wheels 2L and 2R.

Steering mechanism 300 converts the rotational motion of the output shaft of electric motor 100 into a linear motion of a steering rod 310. In the present embodiment, steering mechanism 300 is implemented by a rack and pinion mechanism.

The rotational driving force of electric motor 100 is transmitted to a pinion shaft 330 via a reducer 320.

On the other hand, steering rod 310 includes a rack 311 that meshes with a pinion 331 provided on pinion shaft 330. When pinion 331 rotates, steering rod 310 moves horizontally in a lateral direction with respect to the traveling direction of vehicle 1, and as a result, the steering angle of steered road wheels 2L and 2R changes.

Electric motor 100 is a brushless motor and includes a motor rotation angle sensor 101 that detects a rotor position.

Here, steering mechanism 300 may be implemented by, for example, a mechanism using a ball screw instead of a rack and pinion mechanism.

Steering input device 3000 includes steering wheel 500 operated by a driver of vehicle 1, a steering shaft 510 that rotates along with the rotation of steering wheel 500, an electric motor 600 used as a steering reaction force actuator that generates steering reaction force, a second ECU 700 that drives and controls electric motor 600, and a second rotation angle detection device 800 (in other words, a rotation angle detector) that detects a steering angle of steering wheel 500.

First ECU 200 of steering device 2000 obtains information on a steering angle of steering wheel 500 detected by second rotation angle detection device 800, and compares the information on the steering angle with information on a steering amount of steered road wheels 2L and 2R detected by first rotation angle detection device 400 to control electrification of electric motor 100.

Also, second ECU 700 of steering input device 3000 controls electrification of electric motor 600 based on information on target reaction force torque generated based on, for example, an estimation result of external force applied to steering mechanism 300, and thereby generates steering reaction force.

Electric motor 600 is a brushless motor and includes a motor rotation angle sensor 601 that detects a rotor position.

The position (in other words, the steering amount) of steering mechanism 300 detected by first rotation angle detection device 400 and the steering angle of steering wheel 500 detected by second rotation angle detection device 800 are steering state quantities of steer-by-wire steering system 1000.

Two control devices implemented by first ECU 200 and second ECU 700 constitute a control device 1100 that outputs signals used to control steer-by-wire in steer-by-wire steering system 1000.

Figure 2:
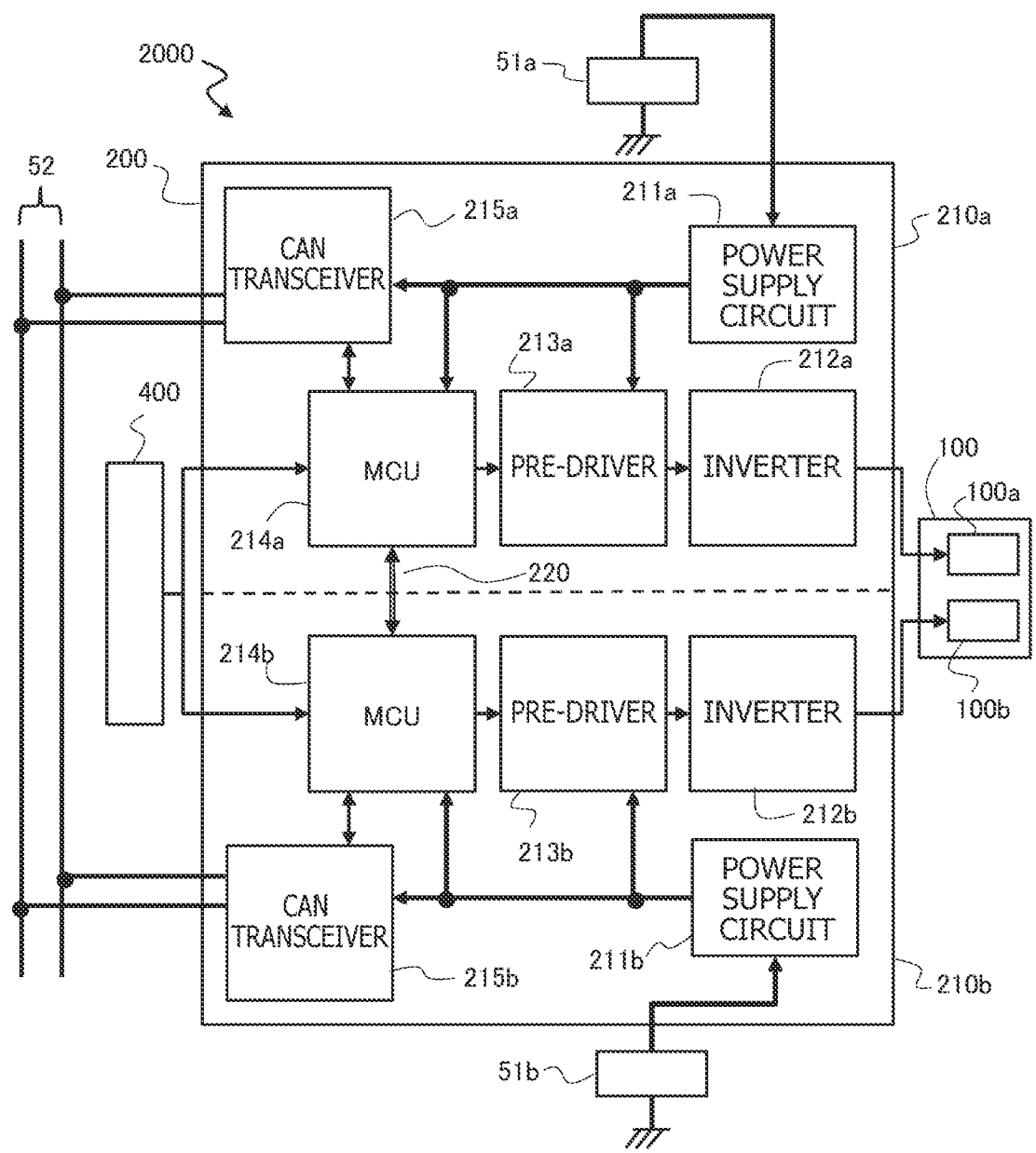
FIG. 2 is a block diagram illustrating a configuration of a steering device.

FIG. 2 is a block diagram illustrating a configuration of first ECU 200 of steering device 2000.

Electric motor 100 for generating steering force in steering device 2000 is, for example, a three-phase brushless motor and includes a first coil set 100a and a second coil set 100b each of which includes a U-phase coil, a V-phase coil, and a W-phase coil.

First ECU 200 includes two drive control systems 210a and 210b that separately drive and control coil sets 100a and 100b. Thus, first ECU 200 includes redundant drive control systems for electric motor 100.

First drive control system 210a that drives and controls first coil set 100a includes a first power supply circuit 211a, a first inverter 212a, a first pre-driver 213a, a first micro control unit (MCU) 214a that is an arithmetic processing unit, and a first CAN (Controller Area Network) transceiver 215a.

Second drive control system 210b that drives and controls second coil set 100b includes a second power supply circuit 211b, a second inverter 212b, a second pre-driver 213b, a second MCU 214b that is an arithmetic processing unit, and a second CAN transceiver 215b.

First power supply circuit 211a is connected to a first battery 51a provided in vehicle 1, converts an input power supply voltage from first battery 51a into an internal power supply voltage, and supplies the internal power supply voltage to, for example, a first pre-driver 213a, a first MCU 214a, and a first CAN transceiver 215a in first drive control system 210a.

Second power supply circuit 211b is connected to a second battery 51b provided in vehicle 1, converts an input power supply voltage from second battery 51b into an internal power supply voltage, and supplies the internal power supply voltage to, for example, a second pre-driver 213b, a second MCU 214b, and a second CAN transceiver 215b in second drive control system 210b.

Thus, first drive control system 210a and second drive control system 210b receive power from different power supplies (batteries).

Here, each of the input power supply voltages from first battery 51a and second battery 51b is, for example, 12 V; and each of the internal power supply voltages generated by first power supply circuit 211a and second power supply circuit 211b is, for example, 5 V.

First MCU 214a and second MCU 214b send information to, and receive information from, each other via a communication line 220. For example, each of first MCU 214a and second MCU 214b sends various types of failure information or information about inverter control in the corresponding control system to the other.

Also, first CAN transceiver 215a and second CAN transceiver 215b are connected to a vehicle CAN bus 52 that is a communication line in a controller area network (CAN) communication method.

Each of first MCU 214a and second MCU 214b obtains a signal related to a steering amount output by first rotation angle detection device 400, also obtains information about a steering angle of steering wheel 500 from second ECU 700 via vehicle CAN bus 52, and controls electrification of coil sets 100a and 100b based on the obtained signal and information.

Also, first MCU 214a and second MCU 214b control the steering amount of steered road wheels 2L and 2R to match a target value corresponding to the steering angle of steering wheel 500 by controlling the electrification of coil sets 100a and 100b.

Figure 3:
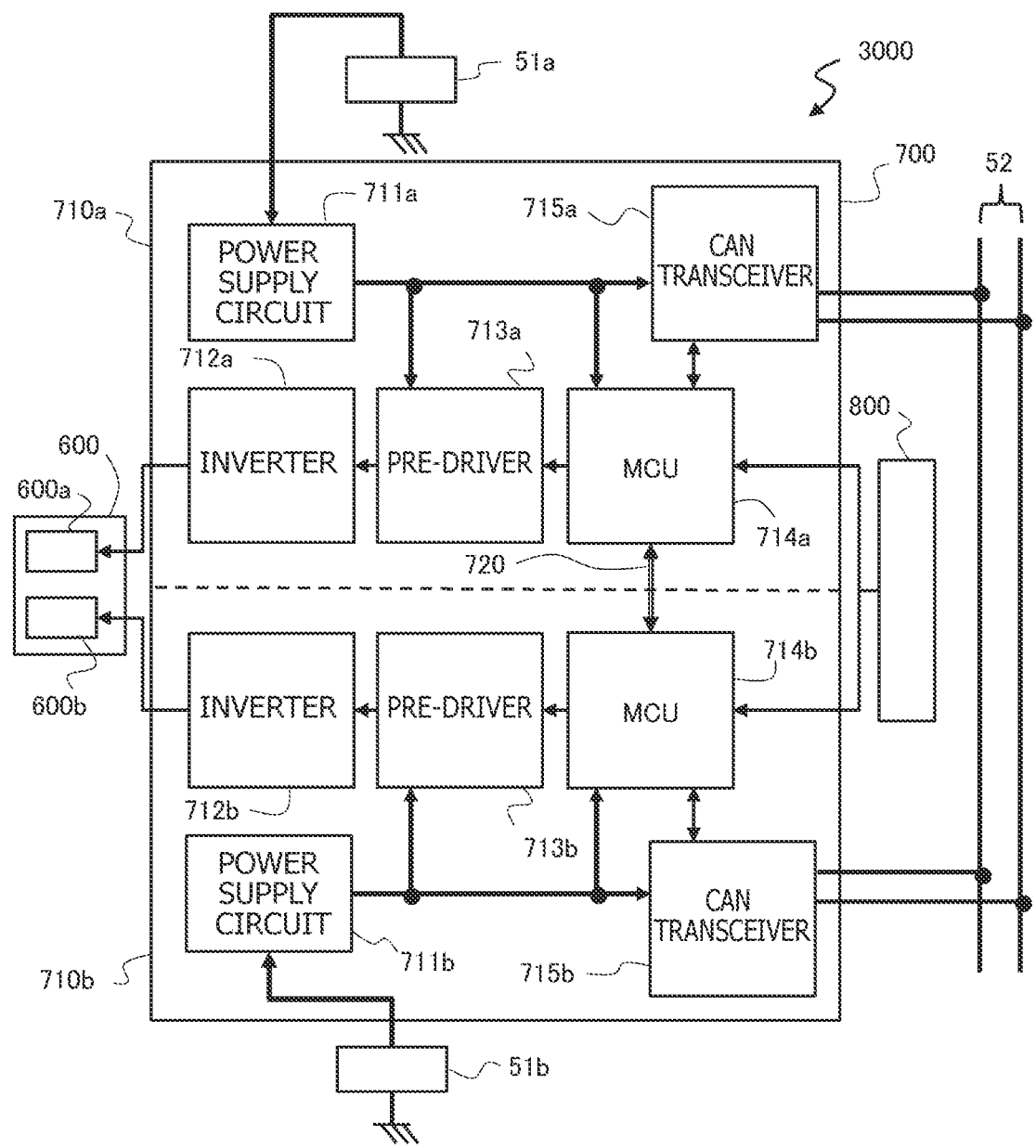
FIG. 3 is a block diagram illustrating a configuration of a steering input device.

FIG. 3 is a block diagram illustrating a configuration of second ECU 700 of steering input device 3000.

Similarly to steering device 2000, steering input device 3000 also includes redundant drive control systems for electric motor 600.

Electric motor 600 that generates steering reaction force in steering input device 3000 is, for example, a three-phase brushless motor and includes a first coil set 600a and a second coil set 600b each of which includes a U-phase coil, a V-phase coil, and a W-phase coil.

Second ECU 700 includes two drive control systems 710a and 710b that separately drive and control coil sets 600a and 600b. Thus, second ECU 700 includes redundant drive control systems for electric motor 600.

First drive control system 710a that drives and controls first coil set 600a includes a first power supply circuit 711a, a first inverter 712a, a first pre-driver 713a, a first MCU 714a, and a first CAN transceiver 715a.

Second drive control system 710b that drives and controls second coil set 600b includes a second power supply circuit 711b, a second inverter 712b, a second pre-driver 713b, a second MCU 714b, and a second CAN transceiver 715b.

First power supply circuit 711a is connected to first battery 51a provided in vehicle 1, converts an input power supply voltage from first battery 51a into an internal power supply voltage, and supplies the internal power supply voltage to, for example, first pre-driver 713a, first MCU 714a, and first CAN transceiver 715a in first drive control system 710a.

Second power supply circuit 711b is connected to second battery 51b provided in vehicle 1, converts an input power supply voltage from second battery 51b into an internal power supply voltage, and supplies the internal power supply voltage to second pre-driver 713b, second MCU 714b, and second CAN transceiver 715b in second drive control system 710b.

That is, first battery 51a supplies power to first drive control system 210a of first ECU 200 and first drive control system 710a of second ECU 700; and second battery 51b supplies power to second drive control system 210b of first ECU 200 and second drive control system 710b of second ECU 700.

First MCU 714a and second MCU 714b send and receive information to and from each other via a communication line 720. For example, each of first MCU 714a and second MCU 714b sends various types of failure information or information about inverter control in the corresponding control system to the other.

Also, first CAN transceiver 715a and second CAN transceiver 715b are connected to vehicle CAN bus 52.

Each of first MCU 714a and second MCU 714b obtains a signal related to the steering angle of steering wheel 500 output by second rotation angle detection device 800, and sends information on the steering angle to first ECU 200 of steering device 2000 via vehicle CAN bus 52.

Also, each of first MCU 714a and second MCU 714b obtains information on a target value of steering reaction force from steering device 2000 via vehicle CAN bus 52, and controls steering reaction force generated by electric motor 600 by controlling electrification of coil sets 600a and 600b based on the obtained information.

Next, configurations of first rotation angle detection device 400 and second rotation angle detection device 800 are described.

Here, because first rotation angle detection device 400 and second rotation angle detection device 800 have the same configuration as rotation angle detectors, separate descriptions of these devices are omitted.

Figure 4:
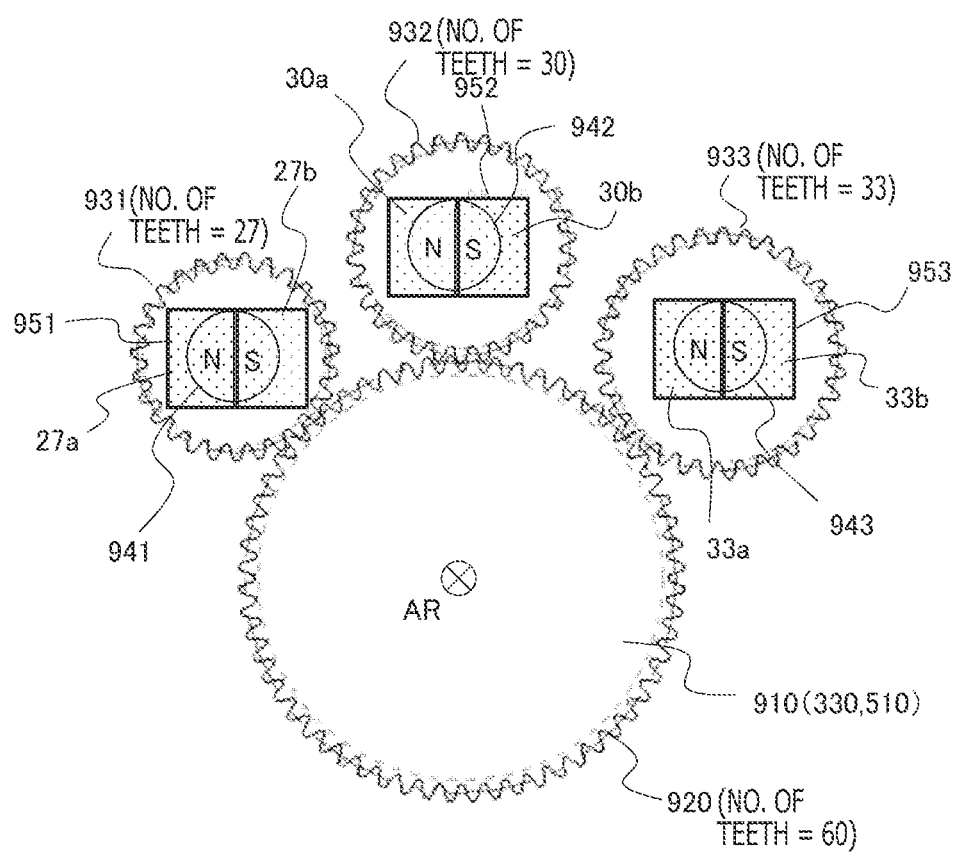
FIG. 4 is a drawing illustrating a configuration of sensors of a rotation angle detection device.

FIG. 4 is a drawing illustrating a configuration of each of first rotation angle detection device 400 and second rotation angle detection device 800.

Each of first rotation angle detection device 400 and second rotation angle detection device 800 is attached to a rotating shaft part 910 that is rotated by an amount of rotation corresponding to the steering state quantity of steer-by-wire, and rotating shaft part 910 rotates about a rotation axis AR.

Here, rotating shaft part 910 in first rotation angle detection device 400 corresponds to, for example, pinion shaft 330 in steering mechanism 300, and rotating shaft part 910 in second rotation angle detection device 800 corresponds to, for example, steering shaft 510. Also, rotating shaft part 910 may be implemented by a rotating shaft part that is different from pinion shaft 330 or steering shaft 510 and that rotates along with the rotation of pinion shaft 330 or steering shaft 510.

A drive gear 920 (gear wheel), which rotates along with the rotation of rotating shaft part 910, is provided on the outer circumference of rotating shaft part 910.

Also, each of three driven gears 931, 932, and 933 meshes with drive gear 920 and rotates in conjunction with the rotation of drive gear 920.

Three driven gears 931, 932, and 933 have different numbers of teeth. In the present embodiment, the number of teeth of drive gear 920 is set at 60, the number of teeth of first driven gear 931 is set at 27, the number of teeth of second driven gear 932 is set at 30, and the number of teeth of third driven gear 933 is set at 33.

When the numbers of teeth are set as described above, the ratio of the numbers of teeth of three driven gears 931, 932, and 933 is 9:10:11, and the numbers of teeth 27, 30, and 33 of three driven gears 931, 932, and 933 are natural number multiples (triples) of the ratio 9:10:11.

In the present embodiment, the numbers of teeth of three driven gears 931, 932, and 933 are triples (27, 30, and 33) of the ratio 9:10:11. However, the numbers of teeth of three driven gears 931, 932, and 933 may be set at twice the ratio 9:10:11. That is, the number of teeth of first driven gear 931 may be set at 18, the number of teeth of second driven gear 932 may be set at 20, and the number of teeth of third driven gear 933 may be set at 22.

In other words, the numbers of teeth of three driven gears 931, 932, and 933 are different from each other and indivisible by each other. Also, the numbers of teeth of three driven gears 931, 932, and 933 are set such that when they are divided by the greatest common factor, the quotients represent a ratio (9:10:11) of natural numbers including two different odd numbers and one even number.

Also, the number of teeth of drive gear 920 is set at a value that is greater than or equal to twice the number of teeth of one of three driven gears 931, 932, and 933 having the smallest number of teeth.

That is, when the number of teeth of first driven gear 931 is 27, the number of teeth of second driven gear 932 is 30, and the number of teeth of third driven gear 933 is 33, the smallest number of teeth is 27, and the number of teeth of drive gear 920 is set at a value greater than or equal to 54 that is two times greater than 27.

As described later, the numbers of teeth of drive gear 920 and driven gears 931, 932, and 933 are adjusted such that the range of the absolute angle of drive gear 920, which is obtained based on the combination of detection signals of the rotation angles of driven gears 931, 932, and 933, includes the detection range of the steering state quantity of steer-by-wire.

For example, in the case of second rotation angle detection device 800 for detecting the steering angle of steering wheel 500, the numbers of teeth are set such that the absolute angle can be detected within the range of the number of lock-to-lock rotations (for example, 4-5 rotations) of steering wheel 500.

In the example of the gear system illustrated in FIG. 4, each of three driven gears 931, 932, and 933 meshes with drive gear 920. Alternatively, driven gears 931, 932, and 933 may be meshed with each other.

For example, first driven gear 931 and third driven gear 933 may be meshed with drive gear 920, and second driven gear 932 may be meshed with first driven gear 931 or third driven gear 933.

Also, first driven gear 931 may be meshed with drive gear 920, second driven gear 932 may be meshed with first driven gear 931, and third driven gear 933 may be meshed with second driven gear 932.

Furthermore, first driven gear 931 may be meshed with drive gear 920, and second driven gear 932 and third driven gear 933 may be meshed with first driven gear 931.

Next, magnetic angle sensors for detecting the amounts of rotation (specifically, absolute angles) of respective driven gears 931, 932, and 933 are described.

Dipole magnets 941, 942, and 943 are attached to the axial centers of respective driven gears 931, 932, and 933, and angle sensors 951, 952, and 953 are disposed to face corresponding magnets 941, 942, and 943.

Each of magnets 941, 942, and 943 is divided into an N pole and an S pole along a straight line passing through the center of the rotation axis of the corresponding one of driven gears 931, 932, and 933 in a cross section orthogonal to the rotation axis. Angle sensors 951, 952, and 953 are disposed to face the corresponding magnets 941, 942, and 943 in the axial directions of driven gears 931, 932, and 933.

Each of angle sensors 951, 952, and 953 includes a magnetoresistive sensor element (MR sensor element) that converts a change in the magnetic field caused by the rotation of the corresponding one of magnets 941, 942, and 943 into an electrical resistance, also converts the electrical resistance into a voltage, and outputs the voltage as an analog signal.

First angle sensor 951 detects the amount of rotation of first driven gear 931, second angle sensor 952 detects the amount of rotation of second driven gear 932, and third angle sensor 953 detects the amount of rotation of third driven gear 933.

Here, each of angle sensors 951, 952, and 953 is a dual die including two MR sensor elements.

First angle sensor 951 integrally includes a first MR sensor element 27*a* and a second MR sensor element 27*b*, second angle sensor 952 integrally includes a first MR sensor element 30*a* and a second MR sensor element 30*b*, and third angle sensor 953 integrally includes a first MR sensor element 33*a* and a second MR sensor element 33*b*.

That is, each of angle sensors 951, 952, and 953 has a redundant configuration.

The amount of rotation of first driven gear 931 is detected by first MR sensor element 27*a* (first sensor) and second MR sensor element 27*b* (second sensor).

Also, the amount of rotation of second driven gear 932 is detected by first MR sensor element 30*a* (third sensor) and second MR sensor element 30*b* (fourth sensor).

Furthermore, the amount of rotation of third driven gear 933 is detected by first MR sensor element 33*a* (fifth sensor) and second MR sensor element 33*b* (sixth sensor).

Although detailed illustration is omitted, each of MR sensor elements 27*a*, 27*b*, 30*a*, 30*b*, 33*a*, and 33*b* is implemented by a combination of four sensor elements having different magnetic sensing directions.

Based on +sin, −sin, +cos, and −cos signals output by the four sensor elements, MR sensor elements 27*a*, 27*b*, 30*a*, 30*b*, 33*a*, and 33*b* output, as rotation amount signals, angle signals $\theta27a$, $\theta27b$, $\theta30a$, $\theta30b$, $\theta33a$, and $\theta33b$, respectively, each of angle signals $\theta27a$, $\theta27b$, $\theta30a$, $\theta30b$, $\theta33a$, and $\theta33b$ indicating an absolute angle (0 deg.-360 deg.) of the corresponding one of driven gears 931, 932, and 933.

Each of MCUs 214*a*, 214*b*, 714*a*, and 714*b* of first ECU 200 and second ECU 700 functions, as described later, as a rotation amount generating unit that obtains the amount of rotation (absolute angle) of rotating shaft part 910 (drive gear 920) by combining two angle signals of different driven gears among angle signals $\theta27a$, $\theta27b$, $\theta30a$, $\theta30b$, $\theta33a$, and $\theta33b$.

In other words, the rotation amount generating unit obtains the amount of rotation of rotating shaft part 910 based on detection values of a combination of sensors that is different from the combination of first MR sensor element 27*a* and second MR sensor element 27*b*, the combination of first MR sensor element 30*a* and second MR sensor element 30*b*, and the combination of first MR sensor element 33*a* and second MR sensor element 33*b*.

Then, each of MCUs 214*a*, 214*b*, 714*a*, and 714*b* of first ECU 200 and second ECU 700 outputs a signal such as a motor drive signal used to control steer-by-wire based on the obtained amount of rotation of rotating shaft part 910, i.e., the amount of rotation (the steering amount of steered road wheels 2L and 2R or the steering angle of steering wheel 500) corresponding to the steering state quantity of steer-by-wire.

In other words, control device 1100 determines the target value of the steering amount based on a detection result of the steering angle of steering wheel 500, and controls electric motor 100 used as a steering actuator such that the detection value of the steering amount of steered road wheels 2L and 2R becomes closer to the target value.

Figure 5:
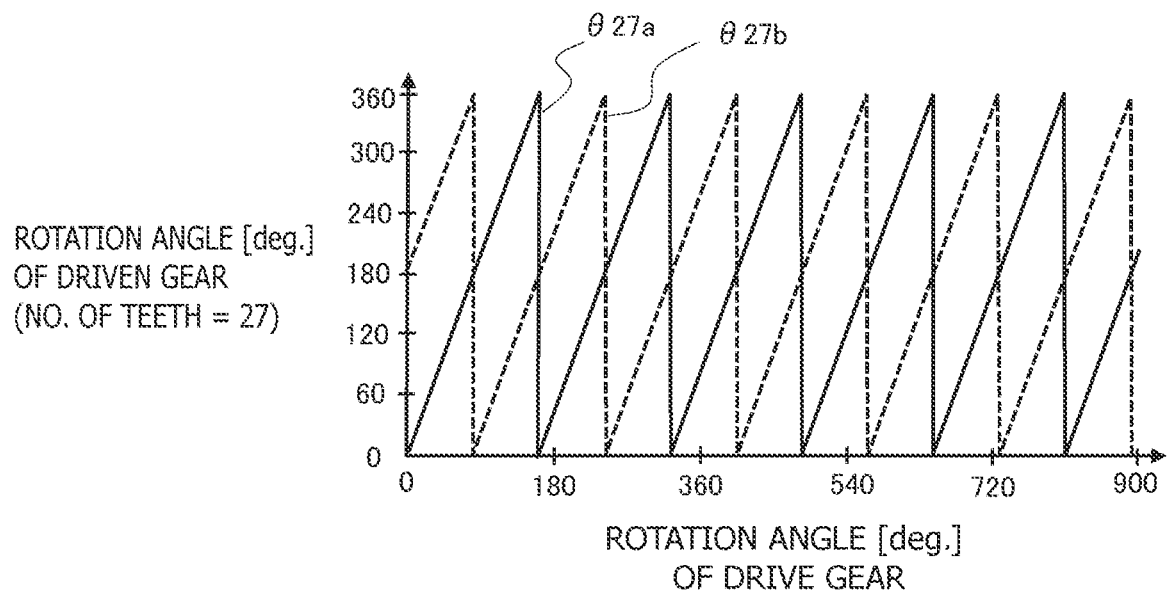
FIG. 5 is a graph showing a correlation between the rotation angle of a drive gear and the rotation angle of a first driven gear.

In FIG. 5, the horizontal axis indicates the rotation angle [deg.] of drive gear 920, and the vertical axis indicates the rotation angle [deg.] of first driven gear 931. FIG. 5 shows changes in angle signal $\theta27a$ of first MR sensor element 27*a* and angle signal $\theta27b$ of second MR sensor element 27*b* in first angle sensor 951 for detecting the rotation angle of first driven gear 931.

Figure 6:
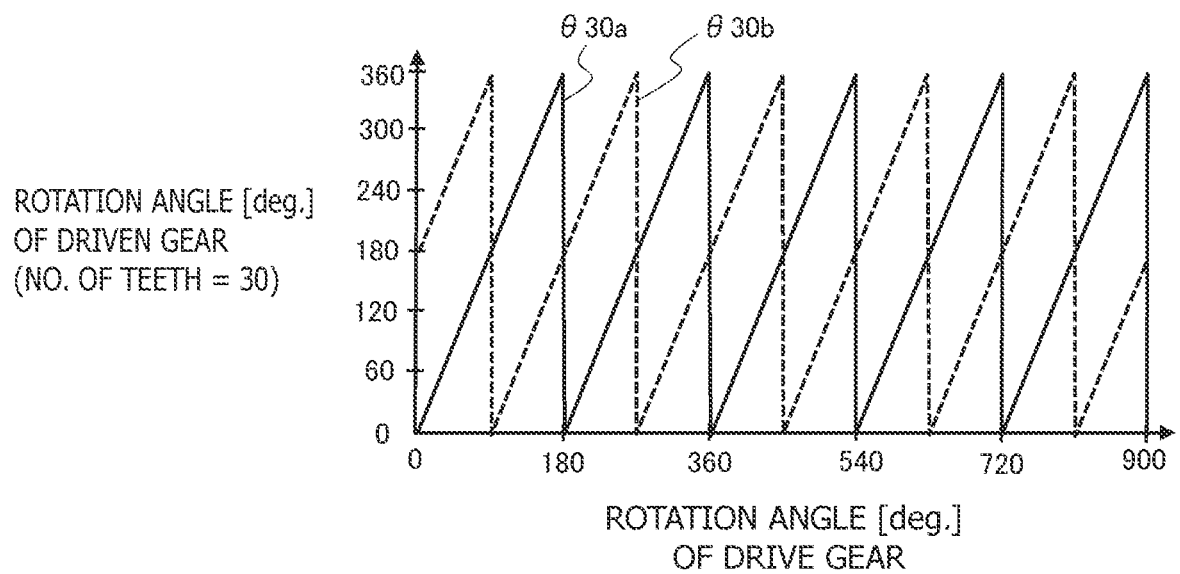
FIG. 6 is a graph showing a correlation between the rotation angle of the drive gear and the rotation angle of a second driven gear.

In FIG. 6, the horizontal axis indicates the rotation angle [deg.] of drive gear 920, and the vertical axis indicates the rotation angle [deg.] of second driven gear 932. FIG. 6 shows changes in angle signal $\theta30a$ of first MR sensor element 30*a* and angle signal $\theta30b$ of second MR sensor element 30*b* in second angle sensor 952 for detecting the rotation angle of second driven gear 932.

Figure 7:
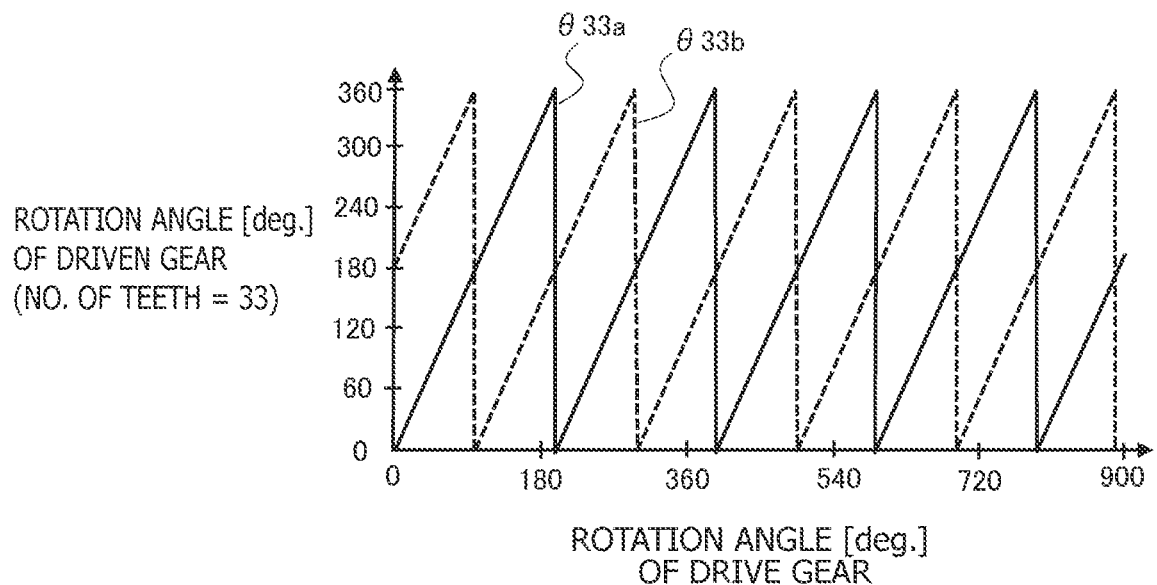
FIG. 7 is a graph showing a correlation between the rotation angle of the drive gear and the rotation angle of a third driven gear.

In FIG. 7, the horizontal axis indicates the rotation angle [deg.] of drive gear 920, and the vertical axis indicates the rotation angle [deg.] of third driven gear 933. FIG. 7 shows changes in angle signal $\theta33a$ of first MR sensor element 33*a* and angle signal $\theta33b$ of second MR sensor element 33*b* in third angle sensor 953 for detecting the rotation angle of third driven gear 933.

An angle signal output by each of MR sensor elements constituting each of angle sensors 951, 952, and 953 has a cycle that corresponds to one rotation of corresponding driven gear 931, 932, or 933; and angle signals of two sensors for detecting the rotation angle of each of driven gears 931, 932, and 933 are output such that the phases of the angle signals are shifted from each other by a half cycle.

Figure 8:
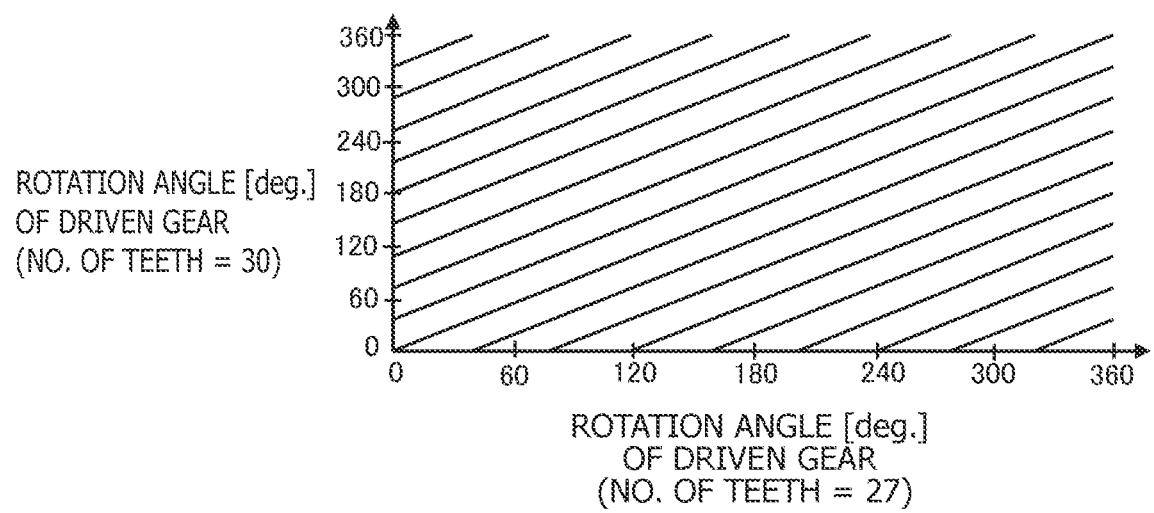
FIG. 8 is a graph showing a correlation between the rotation angle of the first driven gear and the rotation angle of the second driven gear.
Figure 9:
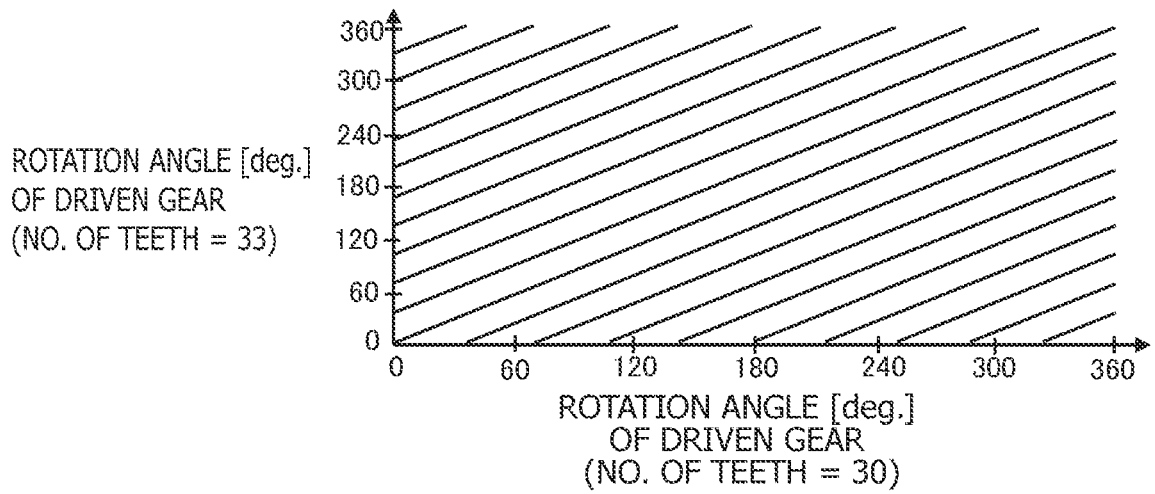
FIG. 9 is a graph showing a correlation between the rotation angle of the second driven gear and the rotation angle of the third driven gear.
Figure 10:
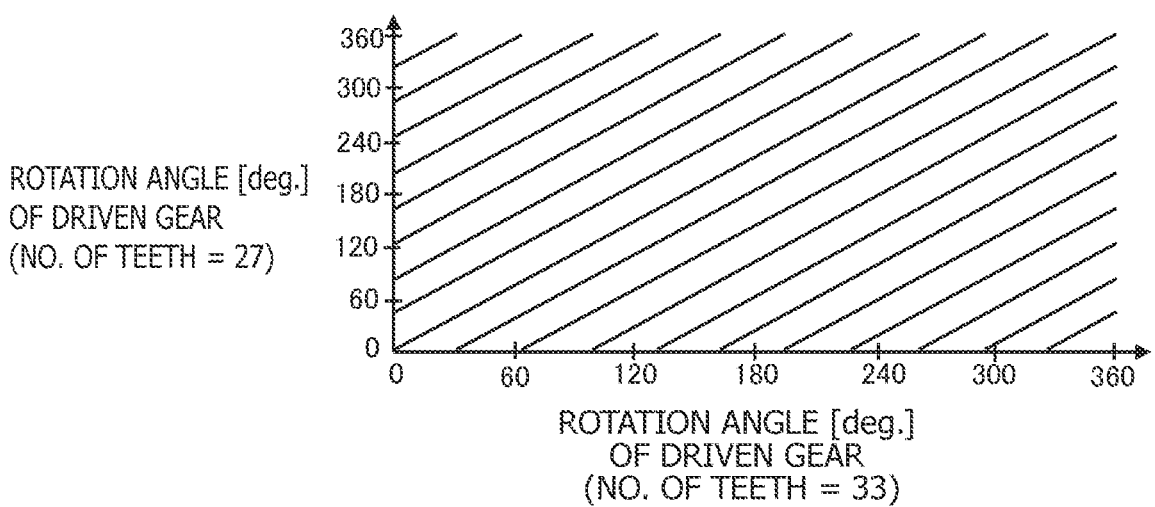
FIG. 10 is a graph showing a correlation between the rotation angle of the third driven gear and the rotation angle of the first driven gear.

FIGS. 8-10 are graphs showing correlations between rotation angles of driven gears 931, 932, and 933.

FIG. 8 shows a correlation between the rotation angle [deg.] of first driven gear 931 and the rotation angle [deg.] of second driven gear 932, FIG. 9 shows a correlation between the rotation angle [deg.] of second driven gear 932 and the rotation angle [deg.] of third driven gear 933, and FIG. 10 shows a correlation between the rotation angle [deg.] of first driven gear 931 and the rotation angle [deg.] of third driven gear 933.

Here, due to differences in number of teeth of driven gears 931, 932, and 933, the cycles of angle signals output by angle sensors 951, 952, and 953 are different from each other.

It is possible to obtain the absolute angle of drive gear 920, i.e., the absolute angle of rotating shaft part 910 (pinion shaft 330 or steering shaft 510) with drive gear 920, by combining angle signals with different cycles.

Figure 11:
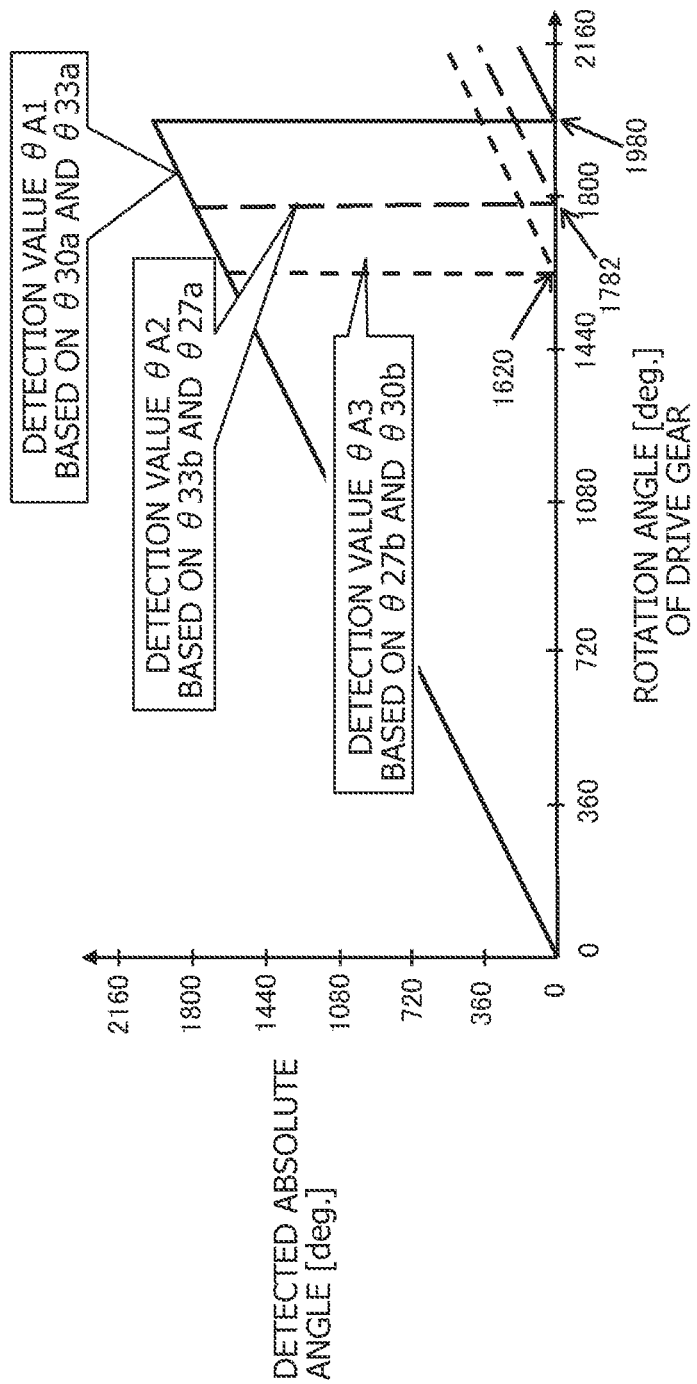
FIG. 11 is a graph showing different absolute angle detection ranges corresponding to combinations of angle signals.

FIG. 11 shows absolute angles of rotating shaft part 910 that are calculated based on three exemplary combinations of angle signals output by angle sensors 951, 952, and 953.

A first absolute angle detection value $\theta A1$ is the absolute angle of rotating shaft part 910 that is obtained based on a combination of an angle signal $\theta30a$ of first MR sensor element 30*a* for detecting the rotation angle of second driven gear 932 and an angle signal $\theta33a$ of first MR sensor element 33*a* for detecting the rotation angle of third driven gear 933.

A second absolute angle detection value $\theta A2$ is the absolute angle of rotating shaft part 910 that is obtained based on a combination of an angle signal $\theta33b$ of second MR sensor element 33*b* for detecting the rotation angle of third driven gear 933 and an angle signal $\theta27a$ of first MR sensor element 27*a* for detecting the rotation angle of first driven gear 931.

A third absolute angle detection value $\theta A3$ is the absolute angle of rotating shaft part 910 that is obtained based on a combination of an angle signal $\theta27b$ of second MR sensor element 27*b* for detecting the rotation angle of first driven gear 931 and an angle signal $\theta30b$ of second MR sensor element 30*b* for detecting the rotation angle of second driven gear 932.

Next, ranges of the absolute angle of rotating shaft part 910 detectable based on combinations of angle signals are described.

Here, the range of the absolute angle of rotating shaft part 910 detectable based on a combination of angle signals varies depending on cycles that differ depending on the numbers of teeth of driven gears.

For example, drive gear 920 rotates 33/60 times, i.e., 198 degrees, while third driven gear 933 with 33 teeth rotates once. On the other hand, drive gear 920 rotates 30/60 times, i.e., 180 degrees, while second driven gear 932 with 30 teeth rotates once.

Therefore, when the absolute angle of drive gear 920 reaches 1980 degrees, phases of angle signal θ30a of first MR sensor element 30a for detecting the rotation angle of second driven gear 932 and angle signal θ33a of first MR sensor element 33a for detecting the rotation angle of third driven gear 933 again become the same as those when the absolute angle of drive gear 920 is 0 degrees.

Accordingly, absolute angle θA1 of drive gear 920 obtained based on the combination of angle signal θ30a of first MR sensor element 30a for detecting the rotation angle of second driven gear 932 and angle signal θ33a of first MR sensor element 33a for detecting the rotation angle of third driven gear 933 falls in a range between 0 degrees and 1980 degrees.

In a similar manner, the ranges of absolute angle θA2 and absolute angle θA3 are determined. Absolute angle θA2 falls in a range between 0 degrees and 1782 degrees, and absolute angle θA3 falls in a range between 0 degrees and 1620 degrees.

Thus, the range of the absolute angle of drive gear 920 obtainable based on a combination of angle signals of driven gears 931, 932, and 933 depends on the difference between the cycles of rotation angle signals to be combined, in other words, it depends on the difference in the number of teeth between driven gears 931, 932, and 933.

Accordingly, the numbers of teeth of driven gears 931, 932, and 933 and combinations of angle signals used to detect the absolute angle are set so as to enable detection of the absolute angle of rotating shaft part 910 in a detection range required for the steer-by-wire steering system 1000, in other words, to enable detection of a required number of rotations of rotating shaft part 910.

Figure 12:
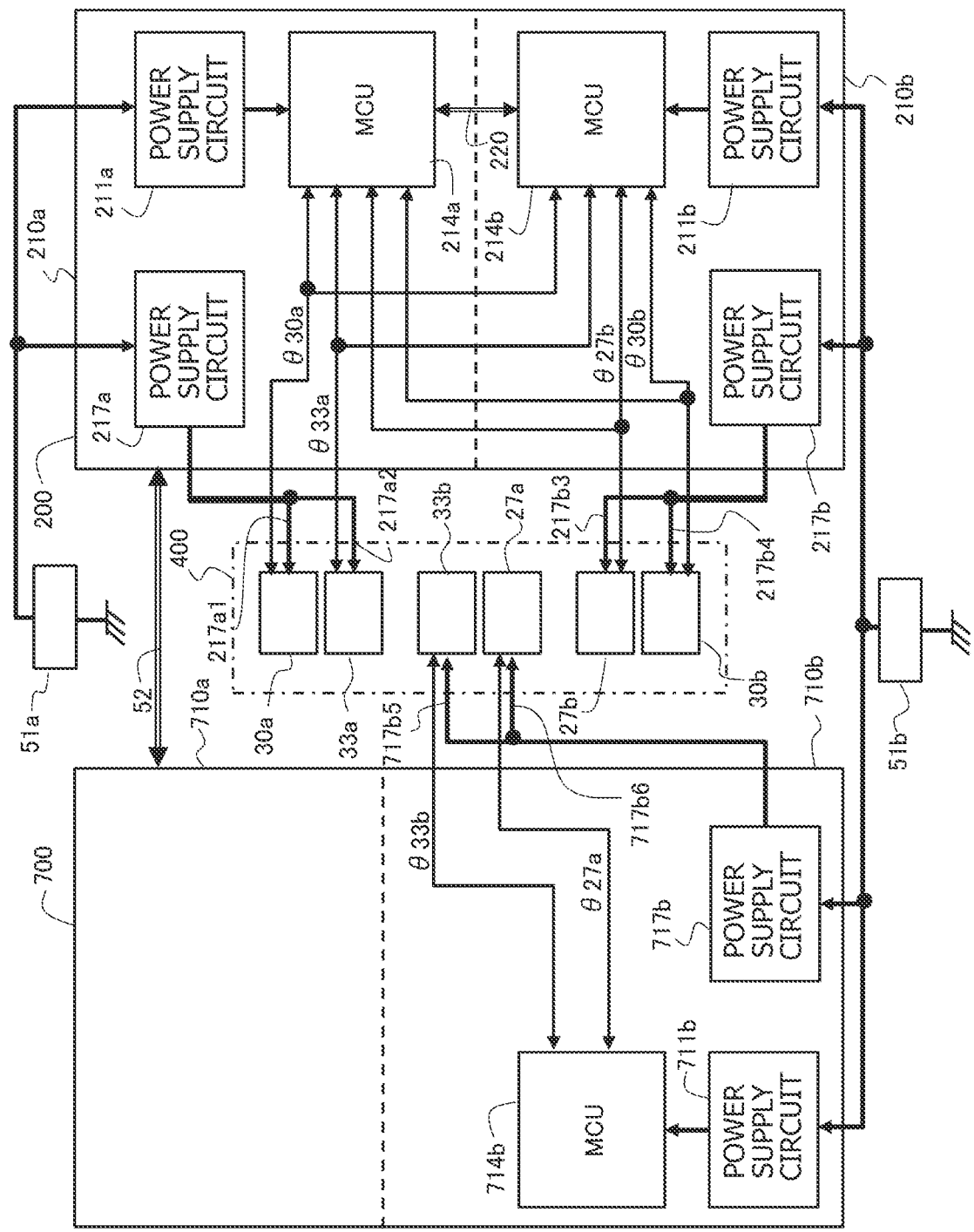
FIG. 12 is a block diagram illustrating power supply paths and detection signal output paths of a first rotation angle detection device.

FIG. 12 is a block diagram illustrating power supply paths to respective MR sensor elements and output paths of detection signals of respective MR sensor elements in first rotation angle detection device 400 according to an embodiment.

A first sensor power supply circuit 217a to which power is supplied from first battery 51a is provided in first drive control system 210a of first ECU 200, and a second sensor power supply circuit 217b to which power is supplied from second battery 51b is provided in second drive control system 210b of first ECU 200.

Also, a fourth sensor power supply circuit 717b to which power is supplied from second battery 51b is provided in second drive control system 710b of second ECU 700.

Also, there are provided a first power supply line 217a1 (first power supply) for supplying power from first sensor power supply circuit 217a to first MR sensor element 30a, and a second power supply line 217a2 (second power supply) for supplying power from first sensor power supply circuit 217a to first MR sensor element 33a.

Also, there are provided a third power supply line 217b3 (third power supply) for supplying power from second sensor power supply circuit 217b to second MR sensor element 27b, and a fourth power supply line 217b4 (fourth power supply) for supplying power from second sensor power supply circuit 217b to second MR sensor element 30b.

Furthermore, there are provided a fifth power supply line 717b5 (fifth power supply) for supplying power from fourth sensor power supply circuit 717b to second MR sensor element 33b, and a sixth power supply line 717b6 (sixth power supply) for supplying power from fourth sensor power supply circuit 717b to first MR sensor element 27a.

Thus, as sensor power supply circuits for supplying power to MR sensor elements 27a, 27b, 30a, 30b, 33a, and 33b of first rotation angle detection device 400, control device 1100 includes three sensor power supply circuits including first sensor power supply circuit 217a (first power supply circuit), second sensor power supply circuit 217b (second power supply circuit), and fourth sensor power supply circuit 717b (third power supply circuit). MR sensor elements 27a, 27b, 30a, 30b, 33a, and 33b are grouped into three combination patterns, each of which is a combination of MR sensor elements for detecting the amounts of rotation of driven gears that are different from each other; and one of three sensor power supply circuits 217a, 217b, and 717b is assigned to each of the combination patterns.

With this configuration, each of three sensor power supply circuits 217a, 217b, and 717b supplies power to two MR sensor elements, and each of MR sensor elements 27a, 27b, 30a, 30b, 33a, and 33b is supplied with power from one of three MR sensor elements 217a, 217b, and 717b.

Also, three sensor power supply circuits 217a, 217b, and 717b for supplying power to respective MR sensor elements 27a, 27b, 30a, 30b, 33a, and 33b of first rotation angle detection device 400 are provided in separate drive control systems 210a, 210b, and 710b; first ECU 200 includes two sensor power supply circuits 217a and 217b; and second ECU 700 includes one sensor power supply circuit 717b.

As described above, providing triple-redundant sensor power supply circuits improves the robustness against failure of sensor power supply circuits. Also, providing three sensor power supply circuits 217a, 217b, and 717b in separate control devices (in other words, multiple drive control systems) improves the robustness against failure of sensor power supply circuits.

Also, because first sensor power supply circuit 217a is supplied with power from first battery 51a, and second sensor power supply circuit 217b and fourth sensor power supply circuit 717b are supplied with power from second battery 51b, at least one of the sensor power supply circuits can continue to supply power even if one of first battery 51a and second battery 51b fails.

Moreover, each combination of two MR sensor elements to which power is supplied from the same sensor power supply circuit enables calculation of the absolute angle of rotating shaft part 910. Furthermore, as described later, each drive control system includes a power supply circuit for supplying power to, for example, an MCU and a sensor power supply circuit that are supplied with power from the same battery; and as described later, each drive control system obtains outputs of MR sensor elements that are supplied with power from the sensor power supply circuit of the drive control system.

For example, in a system illustrated in FIG. 12, even if second battery 51b fails, and two sensor power supply circuits 217b and 717b stop supplying power to MR sensor elements, the supply of power from first battery 51a to first drive control system 210a is continued.

Therefore, the supply of power from first sensor power supply circuit 217a to MR sensor element 30a and MR sensor element 33a is continued, and first MCU 214a can obtain angle signal θ30a and angle signal θ33a to calculate the absolute angle (steering amount) of rotating shaft part 910 and can perform electrification control (in other words, steering control) of first coil set 100a of electric motor 100.

In this case, because first drive control system 710a of second ECU 700 also receives power from first battery 51a, first drive control system 710a can detect the absolute angle of steering shaft 510 and send information on the detected absolute angle to first ECU 200, and can also continue control of steering reaction force.

Here, for example, when first ECU 200 has triple-redundant drive control systems, a sensor power supply circuit may be provided in each of the drive control systems so that first ECU 200 includes three sensor power supply circuits.

Also, a system may be configured such that power is supplied to MR sensor elements of first rotation angle detection device 400 from the sensor power supply circuit (first power supply circuit) provided in first drive control system 710a of second ECU 700, the sensor power supply circuit (second power supply circuit) provided in second drive control system 710b of second ECU 700, and the sensor power supply circuit (third power supply circuit) provided in second drive control system 210b of first ECU 200.

Next, output paths of angle signals (detection signals) from MR sensor elements in the system illustrated in FIG. 12 are described.

Each of first MCU 214a and second MCU 214b of first ECU 200 is connected to first MR sensor element 30a, first MR sensor element 33a, second MR sensor element 27b, and second MR sensor element 30b constituting first rotation angle detection device 400, and obtains angle signal θ30a from first MR sensor element 30a, angle signal θ33a from first MR sensor element 33a, angle signal θ27b from second MR sensor element 27b, and angle signal θ30b from second MR sensor element 30b.

Also, second MCU 714b of second ECU 700 is connected to second MR sensor element 33b and first MR sensor element 27a constituting first rotation angle detection device 400, and obtains angle signal θ33b from second MR sensor element 33b and angle signal θ27a from first MR sensor element 27a.

Each of first MCU 214a, second MCU 214b, and second MCU 714b includes a function of a rotation amount generating unit that detects the absolute angle of rotating shaft part 910 (pinion shaft 330) on which drive gear 920 is provided, i.e., an amount (amount of rotation) related to the steering amount of steered road wheels 2L and 2R, by combining detection results that are among the obtained angle signals and are related to different driven gears.

Here, information on the angle signals obtained by first MCU 214a, second MCU 214b, and second MCU 714b from first rotation angle detection device 400 and the absolute angles of rotating shaft part 910 (pinion shaft 330) obtained by first MCU 214a, second MCU 214b, and second MCU 714b can be shared by MCUs 214a, 214b, 714a, and 714b by communication via vehicle CAN bus 52 and communication lines 220 and 720 between MCUs.

Also, the system may be configured such that first MCU 714a, instead of second MCU 714b, supplies power to second MR sensor element 33b and first MR sensor element 27a, and obtains angle signals from second MR sensor element 33b and first MR sensor element 27a.

In the system illustrated in FIG. 12, first ECU 200 and second ECU 700 including functions of controlling steer-by-wire, i.e., control device 1100, obtain angle signals output by MR sensor elements 27a, 27b, 30a, 30b, 33a, and 33b of first rotation angle detection device 400, and perform calculation processes to obtain the absolute angle (the amount of rotation) of rotating shaft part 910 (pinion shaft 330).

Instead of this system, it is also possible to provide a system in which first rotation angle detection device 400 includes an arithmetic processing unit such as an MCU or an MPU, and the arithmetic processing unit of first rotation angle detection device 400 performs a calculation process to combine angle signals and thereby obtain the absolute angle (the amount of rotation) of rotating shaft part 910 (pinion shaft 330).

Figure 13:
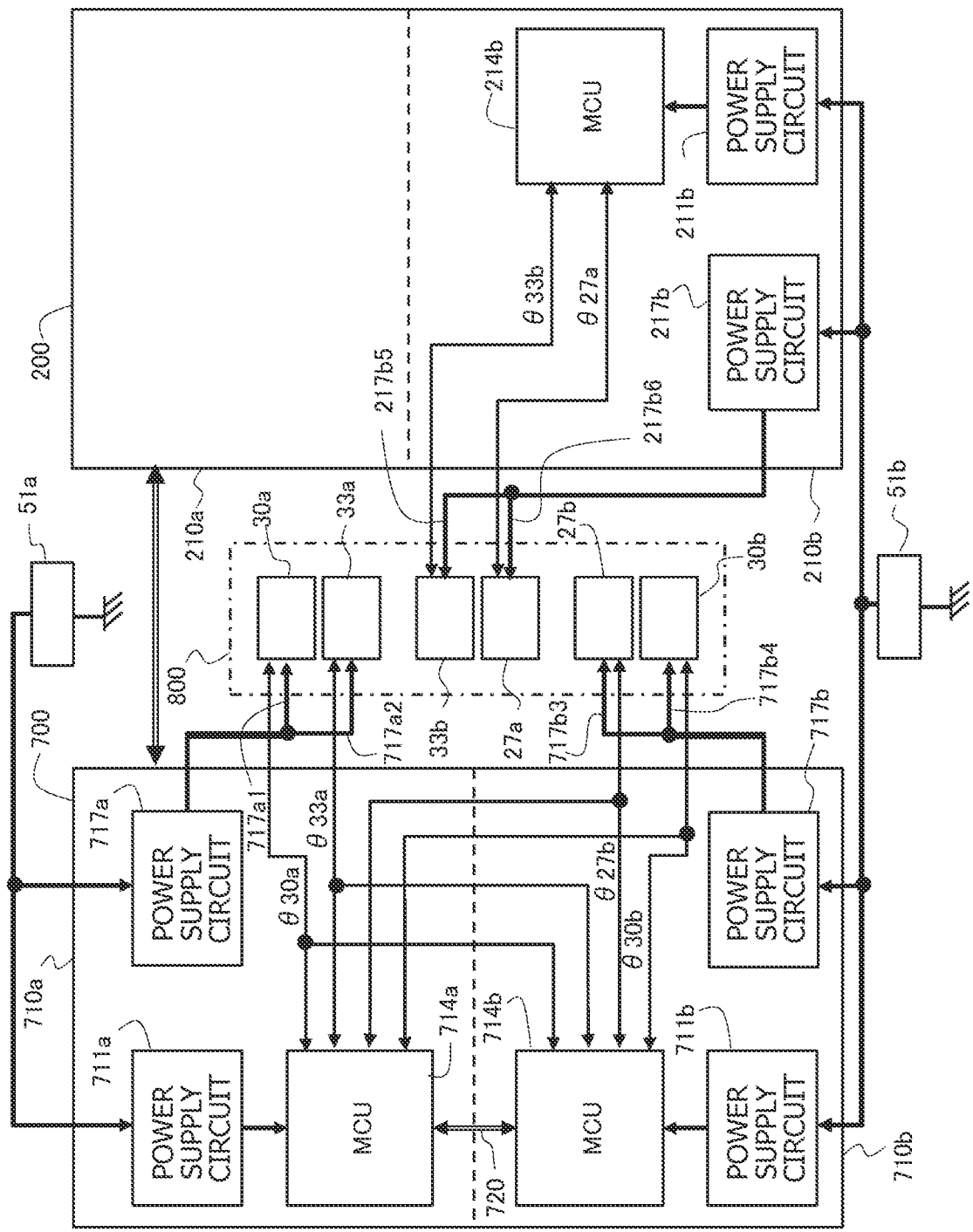
FIG. 13 is a block diagram illustrating power supply paths and detection signal output paths of a second rotation angle detection device.
Figure 18:
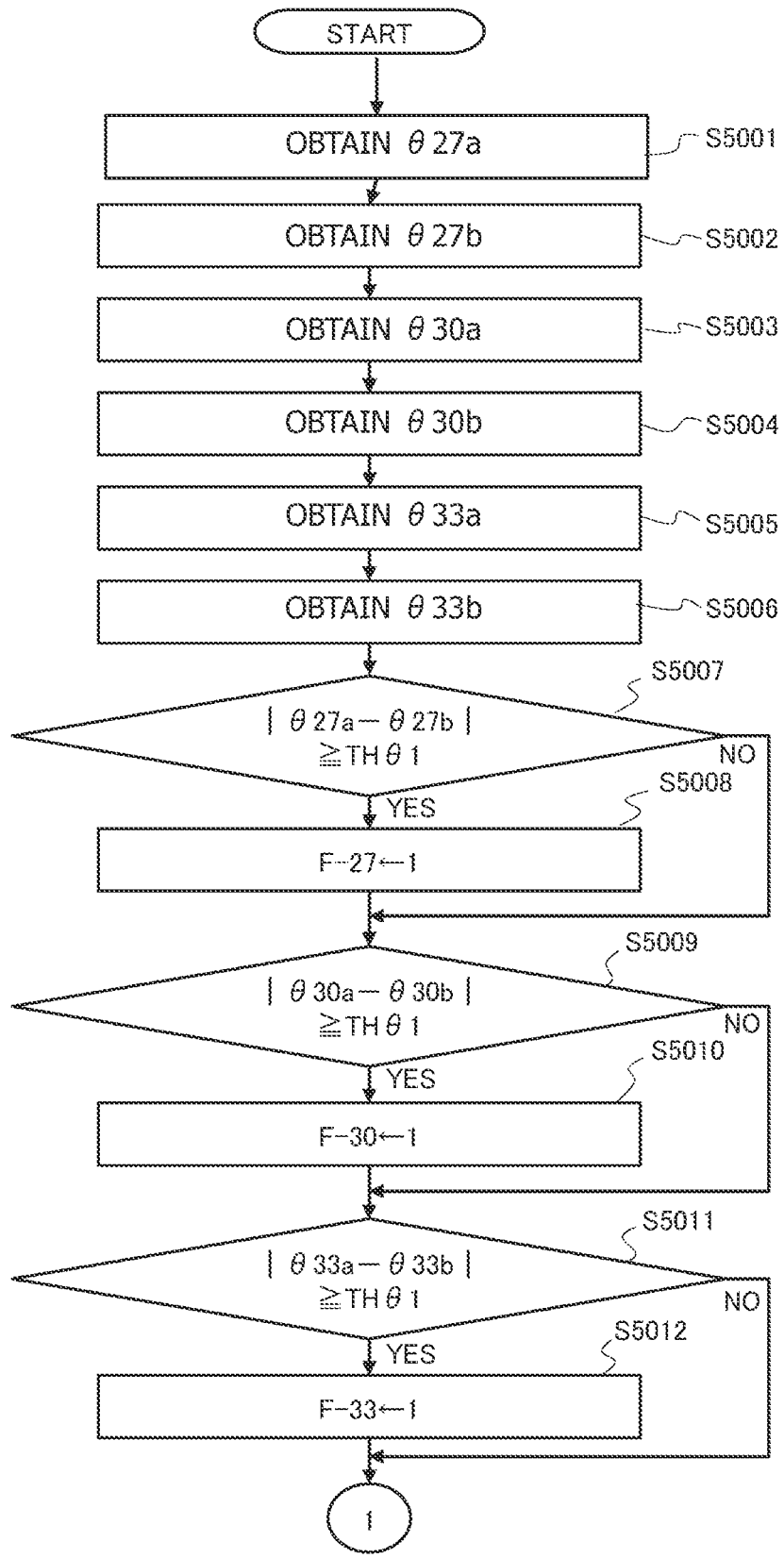
FIG. 18 is a flowchart illustrating a failure diagnosis process for MR sensor elements based on detection results of the MR sensor elements.
Figure 19:
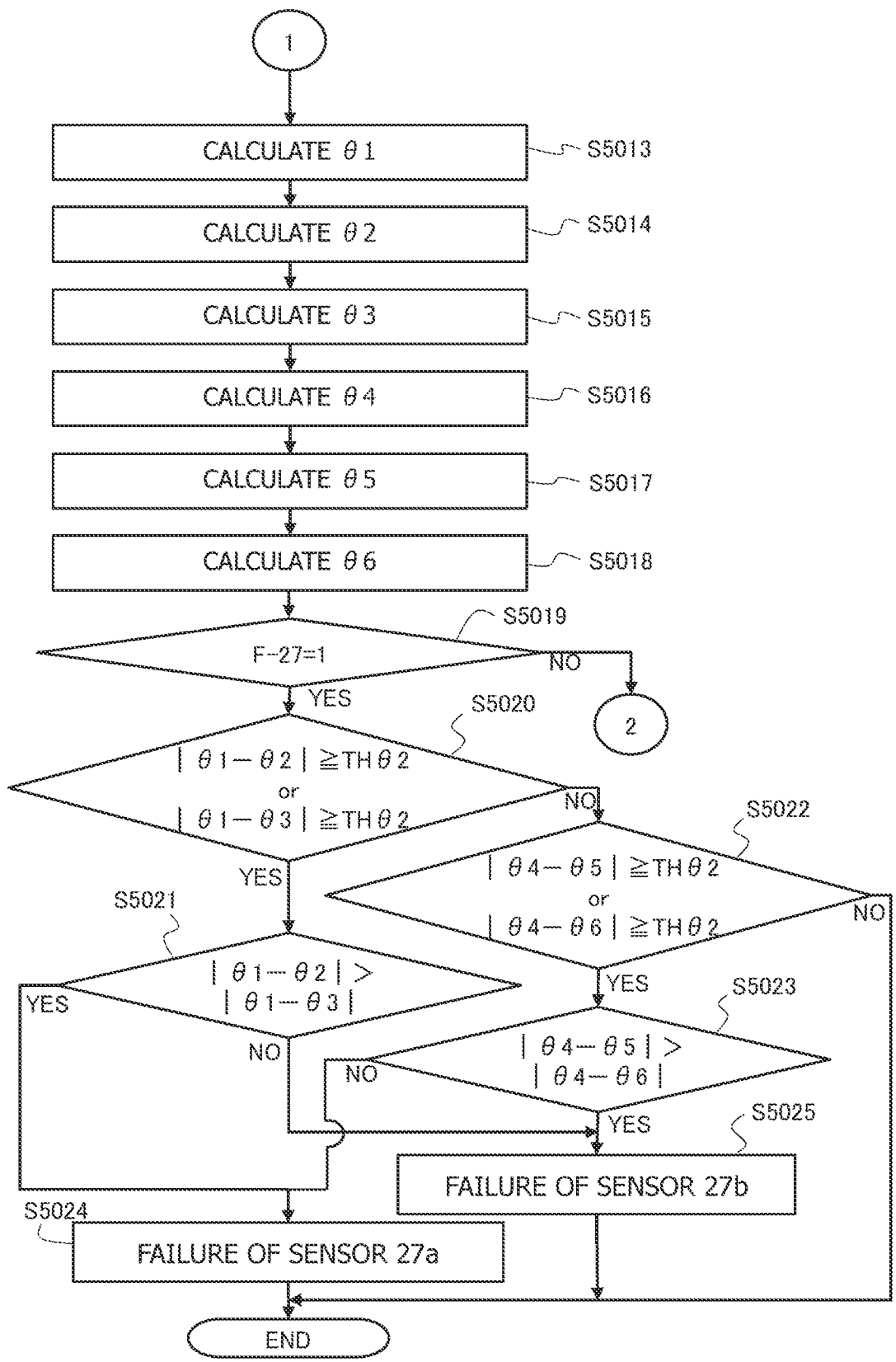
FIG. 19 is a flowchart illustrating the failure diagnosis process for the MR sensor elements based on the detection results of the MR sensor elements.
Figure 20:
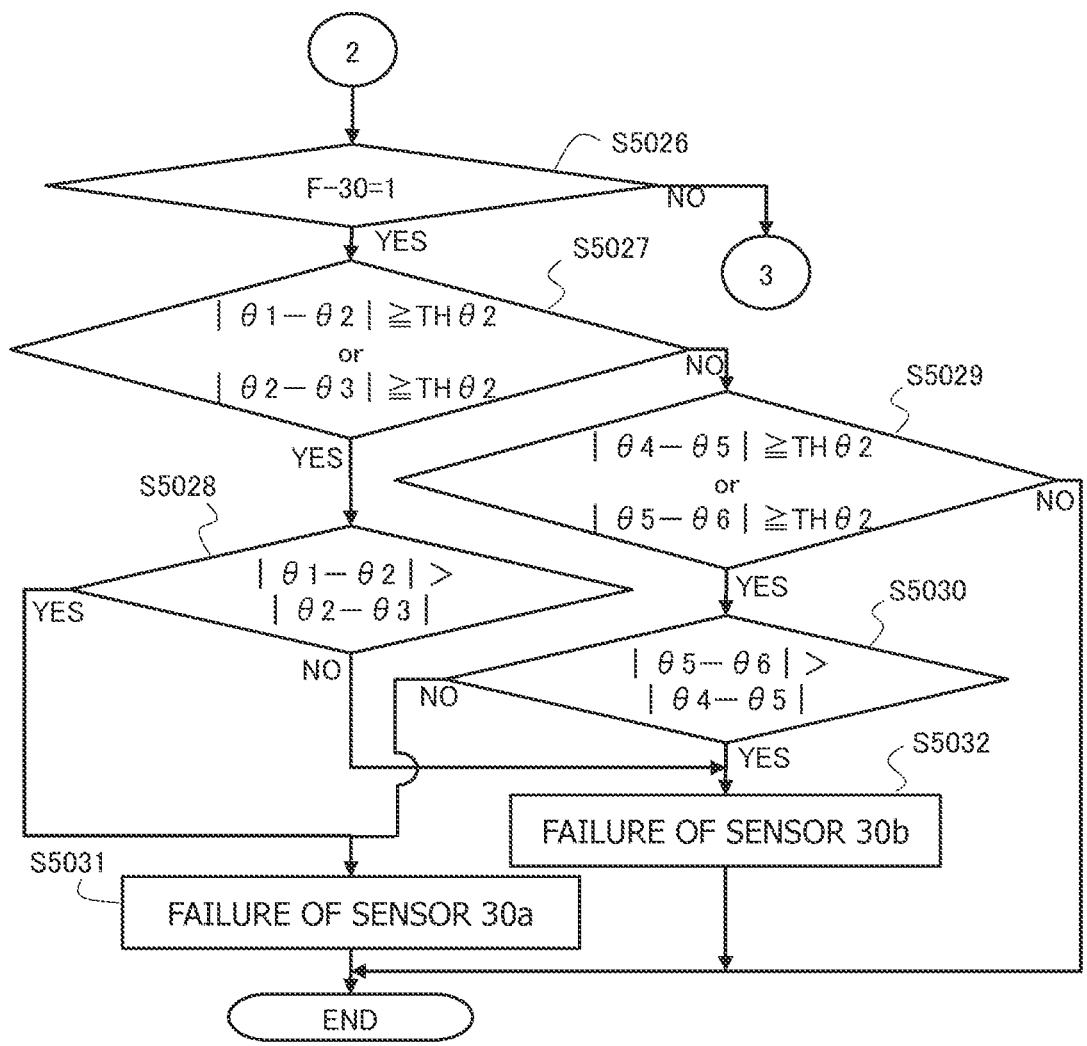
FIG. 20 is a flowchart illustrating the failure diagnosis process for the MR sensor elements based on the detection results of the MR sensor elements.
Figure 21:
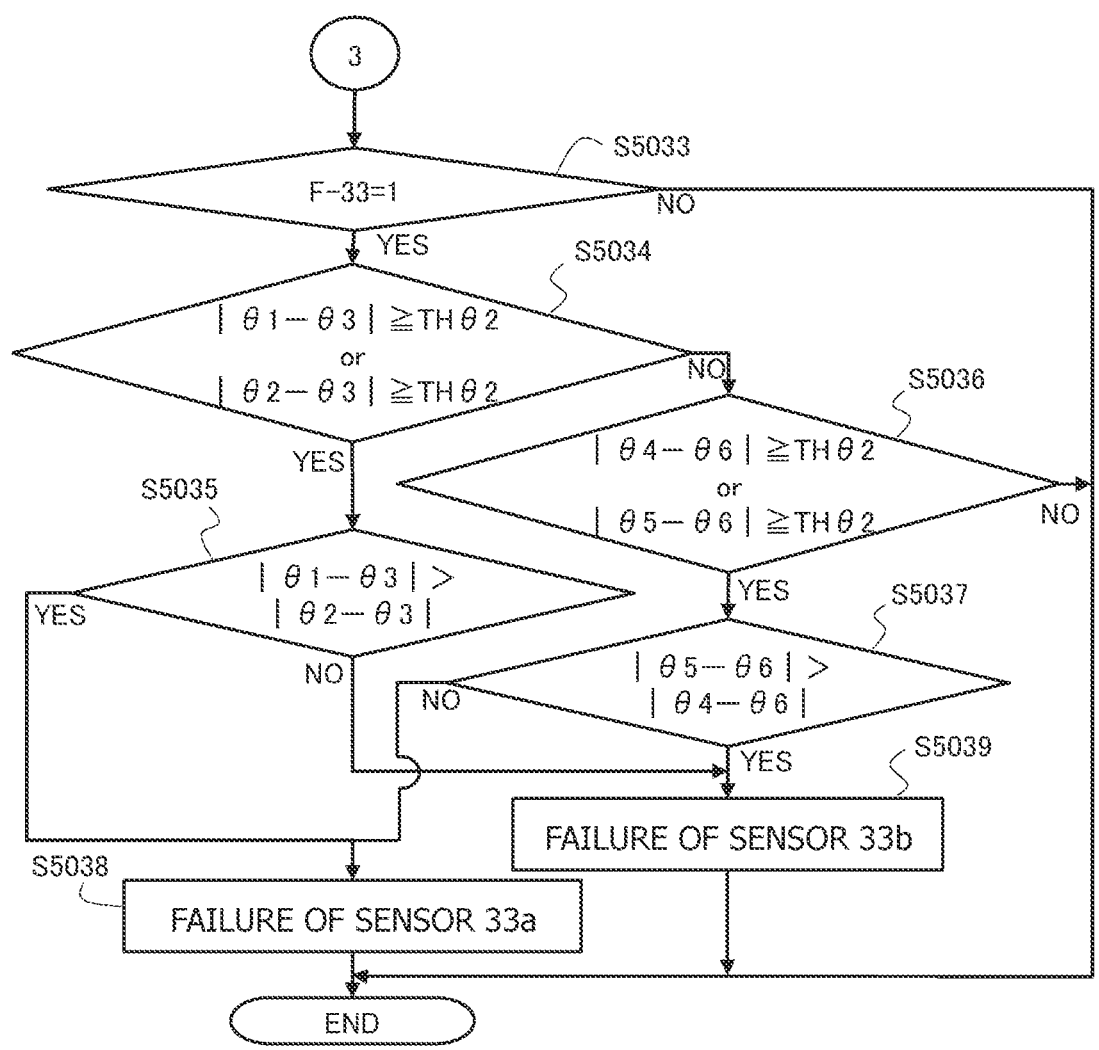
FIG. 21 is a flowchart illustrating the failure diagnosis process for the MR sensor elements based on the detection results of the MR sensor elements.
Figure 22:
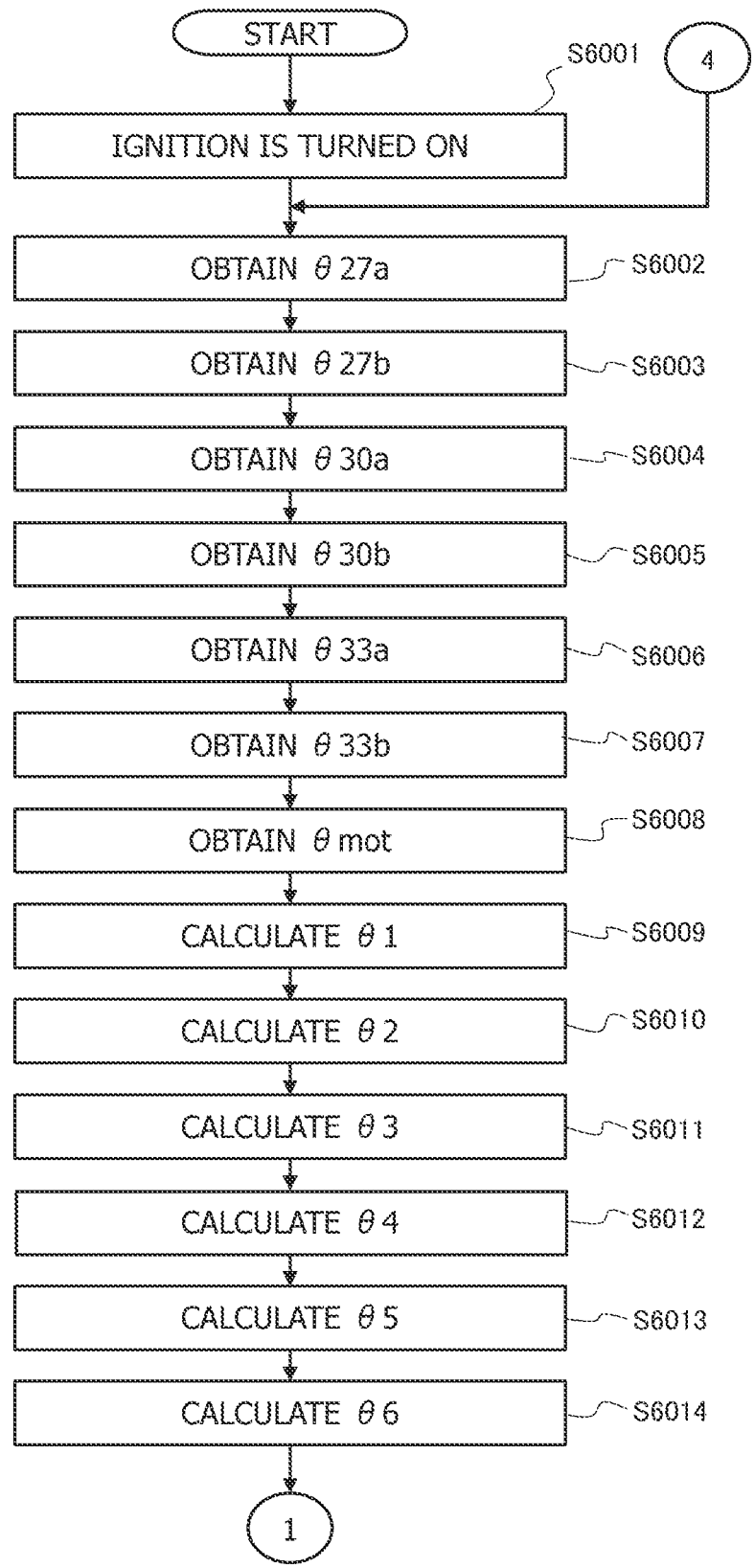
FIG. 22 is a flowchart illustrating a failure diagnosis process for MR sensor elements based on detection results of the MR sensor elements and a detection result of a motor rotation sensor.
Figure 23:
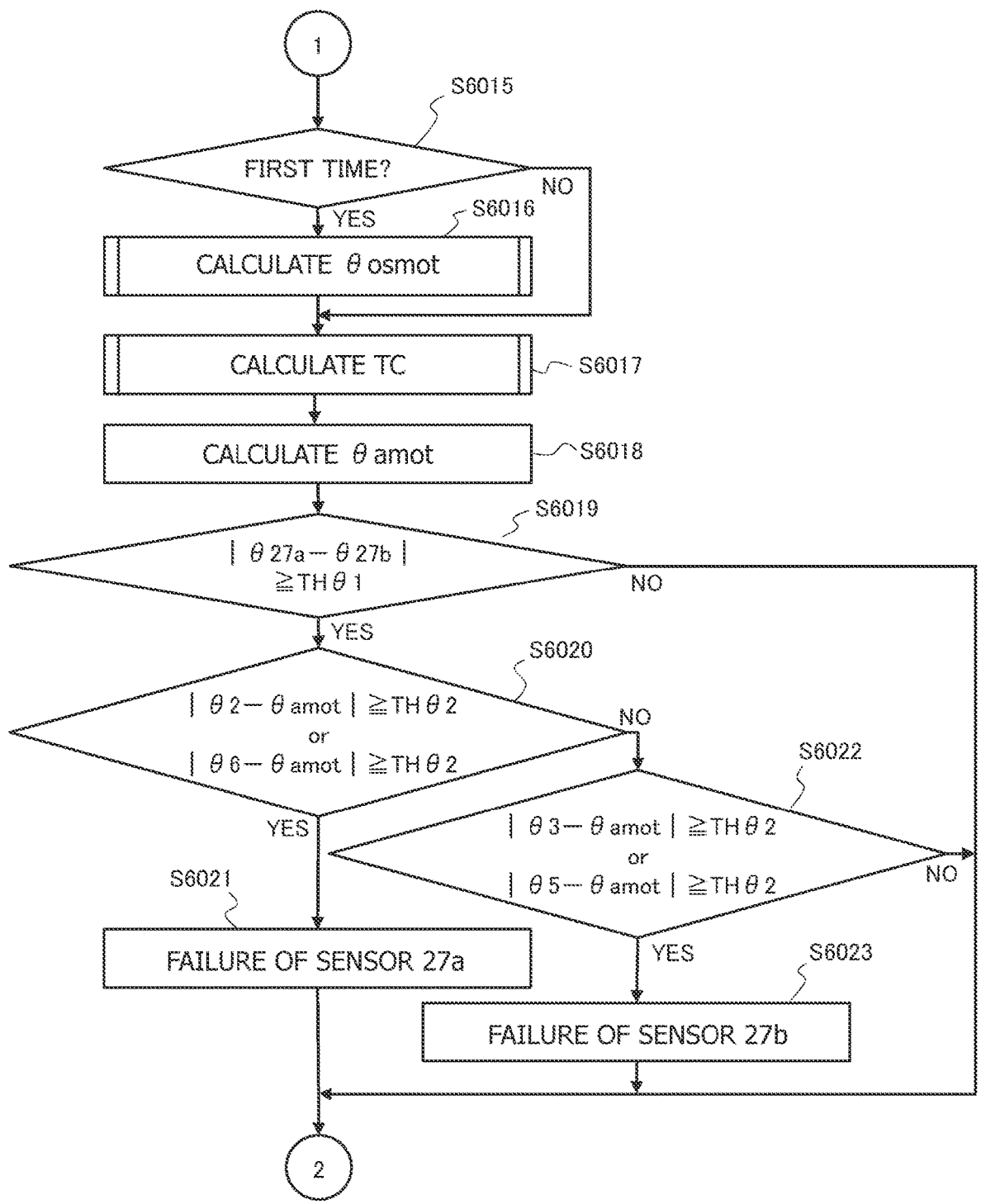
FIG. 23 is a flowchart illustrating the failure diagnosis process for the MR sensor elements based on the detection results of the MR sensor elements and the detection result of the motor rotation sensor.
Figure 24:
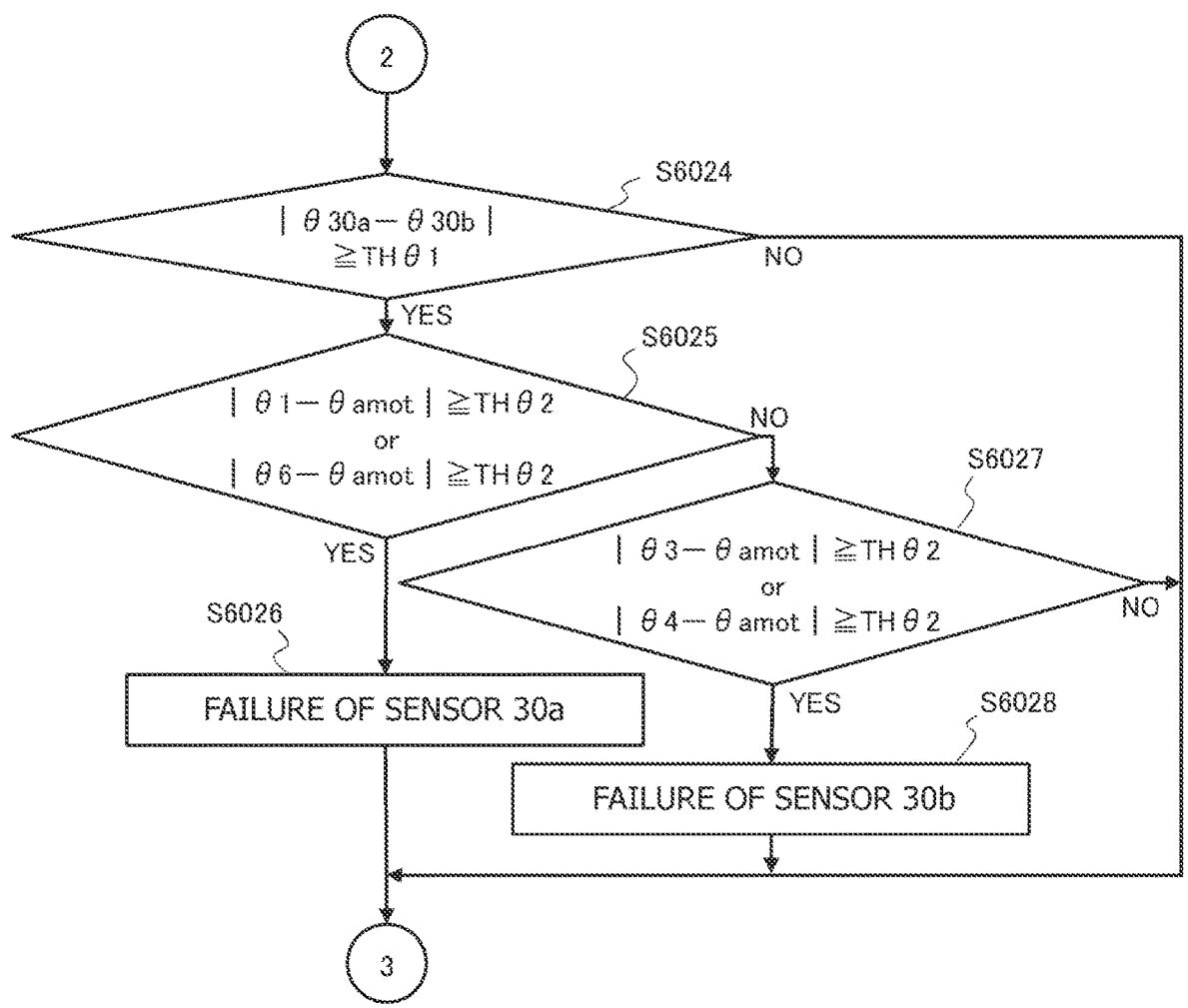
FIG. 24 is a flowchart illustrating the failure diagnosis process for the MR sensor elements based on the detection results of the MR sensor elements and the detection result of the motor rotation sensor.
Figure 25:
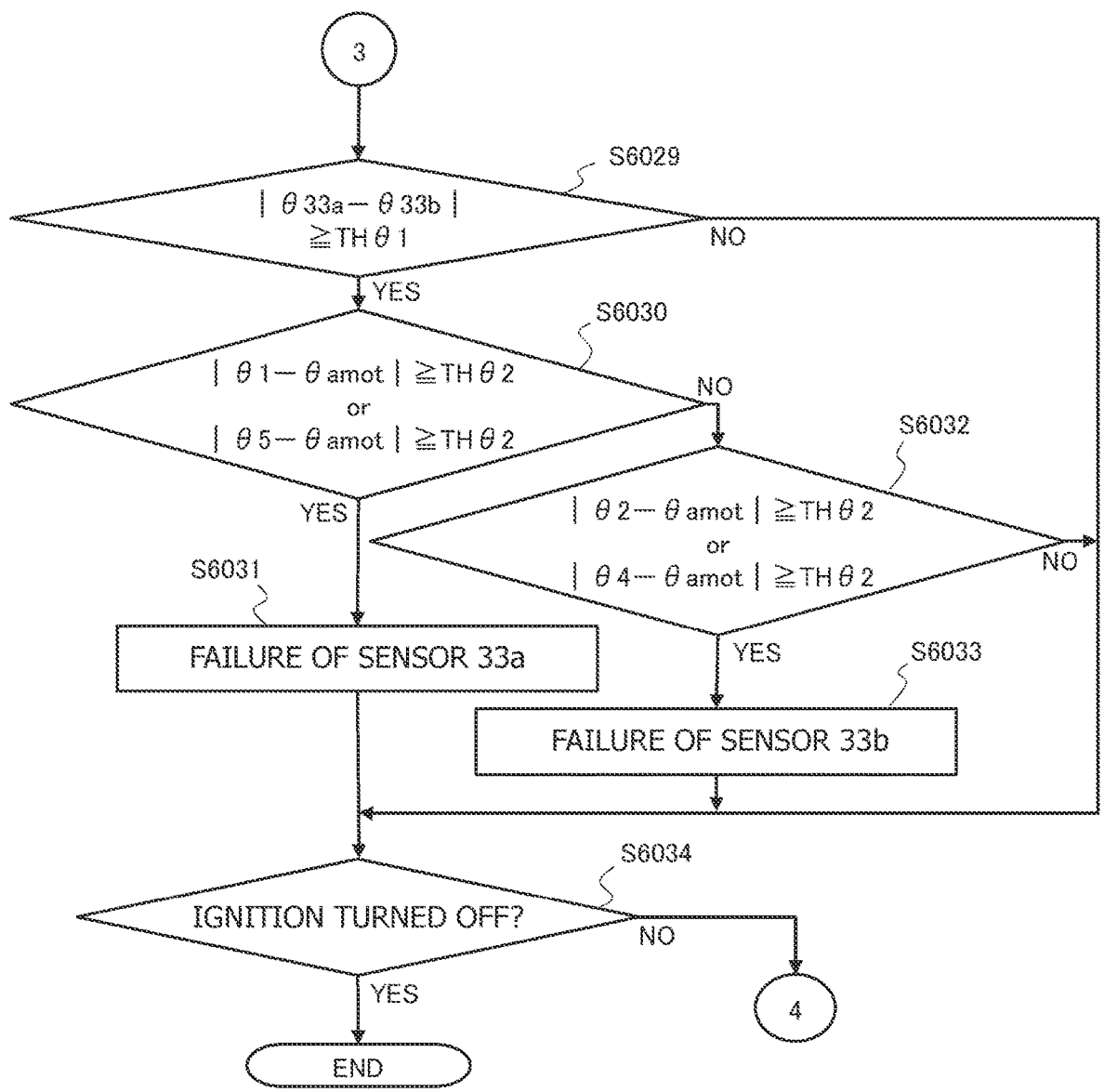
FIG. 25 is a flowchart illustrating the failure diagnosis process for the MR sensor elements based on the detection results of the MR sensor elements and the detection result of the motor rotation sensor.

FIG. 13 is a block diagram illustrating power supply paths to MR sensor elements and output signal lines of the MR sensor elements in second rotation angle detection device 800 according to an embodiment.

In FIG. 13, although the configurations of first ECU 200 and second ECU 700 in FIG. 12 are interchanged, the power supply paths and the output signal lines have configurations similar to those in FIG. 12.

First drive control system 710a of second ECU 700 includes a third sensor power supply circuit 717a (first power supply circuit) connected to first battery 51a.

Also, there are provided a first power supply line 717a1 (first power supply) for supplying power from third sensor power supply circuit 717a to first MR sensor element 30a, and a second power supply line 717a2 (second power supply) for supplying power from third sensor power supply circuit 717a to first MR sensor element 33a.

Also, there are provided a third power supply line 717b3 (third power supply) for supplying power from fourth sensor power supply circuit 717b (second power supply circuit) of second ECU 700 to second MR sensor element 27b, and a fourth power supply line 717b4 (fourth power supply) for supplying power from fourth sensor power supply circuit 717b to second MR sensor element 30b.

Furthermore, there are provided a fifth power supply line 217b5 (fifth power supply) for supplying power from second sensor power supply circuit 217b (third power supply circuit) of first ECU 200 to second MR sensor element 33b, and a sixth power supply line 217b6 (sixth power supply) for supplying power from second sensor power supply circuit 217b to first MR sensor element 27a.

Each of first MCU 714a and second MCU 714b of second ECU 700 is connected to first MR sensor element 30a, first MR sensor element 33a, second MR sensor element 27b, and second MR sensor element 30b constituting second rotation angle detection device 800, and obtains angle signal θ30a from first MR sensor element 30a, angle signal θ33a from first MR sensor element 33a, angle signal θ27b from second MR sensor element 27b, and angle signal θ30b from second MR sensor element 30b.

Also, second MCU 214b of first ECU 200 is connected to second MR sensor element 33b and first MR sensor element 27a constituting second rotation angle detection device 800, and obtains angle signal θ33b from second MR sensor element 33b and angle signal θ27a from first MR sensor element 27a.

Each of first MCU 714a, second MCU 714b, and second MCU 214b includes a function (rotation angle generation unit) that detects the absolute angle of rotating shaft part 910 (steering shaft 510) on which drive gear 920 is provided, i.e., the amount of rotation of steering wheel 500, by combining detection results that are among the obtained angle signals and are related to different driven gears.

In second rotation angle detection device 800, similarly to first rotation angle detection device 400, information on the angle signals output by MR sensor elements and the absolute angle of rotating shaft part 910 (steering shaft 510) can be shared by MCUs 214a, 214b, 714a, and 714b through communication via vehicle CAN bus 52 and communication lines 220 and 720 between MCUs.

Also, the system may be configured such that first MCU 214a, instead of second MCU 214b, supplies power to second MR sensor element 33b and first MR sensor element 27a, and obtains angle signals from second MR sensor element 33b and first MR sensor element 27a.

Furthermore, the system may be configured such that second rotation angle detection device 800 includes an arithmetic processing unit such as an MCU or an MPU, and the arithmetic processing unit of second rotation angle detection device 800 performs a calculation process to combine angle signals and thereby obtain the absolute angle (the amount of rotation) of rotating shaft part 910 (steering shaft 510).

FIG. 14 through FIG. 17 show combinations of angle signals that are usable for calculating the absolute angle of rotating shaft part 910 and that vary depending on whether there is a failed sensor power supply.

FIG. 14 shows combinations of angle signals that are usable for calculating the absolute angle of rotating shaft part 910 when all of three sensor power supply circuits illustrated in FIG. 12 or FIG. 13, i.e., three sensor power supply circuits 217a, 217b, and 717b for supplying power to MR sensor elements constituting first rotation angle detection device 400 or three sensor power supply circuits 717a, 717b, and 217b for supplying power to MR sensor elements constituting second rotation angle detection device 800, are operating normally.

When all three sensor power supply circuits are operating normally, the absolute angle of rotating shaft part 910 can be calculated based on a combination of angle signal θ27a and one of angle signal θ30a, angle signal θ30b, angle signal θ33a, and angle signal θ33b, a combination of angle signal θ27b and one of angle signal θ30a, angle signal θ30b, angle signal θ33a, and angle signal θ33b, a combination of angle signal θ30a and one of angle signal θ33a and angle signal θ33b, or a combination of angle signal θ30b and one of angle signal θ33a and angle signal θ33b.

That is, when all three sensor power supply circuits are operating normally, there are 12 combinations of angle signals that are usable for calculating the absolute angle of rotating shaft part 910.

On the other hand, FIG. 15 shows combinations of angle signals that are usable for calculating the absolute angle of rotating shaft part 910 when a sensor power supply circuit for supplying power to first MR sensor element 30a and first MR sensor element 33a, i.e., first sensor power supply circuit 217a in FIG. 12 or third sensor power supply circuit 717a in FIG. 13, fails, power is therefore not normally supplied to first MR sensor element 30a and first MR sensor element 33a, and first MR sensor element 30a and first MR sensor element 33a do not operate normally.

When a sensor power supply circuit for supplying power to first MR sensor element 30a and first MR sensor element 33a fails, angle signal θ30a and angle signal θ33a become unusable for calculating the absolute angle of rotating shaft part 910. However, the absolute angle of rotating shaft part 910 can be calculated by using any one of combinations excluding combinations using angle signal θ30a and/or angle signal θ33a.

Specifically, the absolute angle of rotating shaft part 910 can be calculated using a combination of angle signal θ27a and one of angle signal θ30b and angle signal θ33b, a combination of angle signal θ27b and one of angle signal θ30b and angle signal θ33b, or a combination of angle signal θ30b and angle signal θ33b.

Thus, even if a sensor power supply circuit for supplying power to first MR sensor element 30a and first MR sensor element 33a fails, the absolute angle of rotating shaft part 910 can be calculated using any one of five combinations.

Also, FIG. 16 shows combinations of angle signals that are usable for calculating the absolute angle of rotating shaft part 910 when a sensor power supply circuit (second sensor power supply circuit 217b in FIG. 12 or fourth sensor power supply circuit 717b in FIG. 13) for supplying power to second MR sensor element 27b and second MR sensor element 30b fails.

When a sensor power supply circuit for supplying power to second MR sensor element 27b and second MR sensor element 30b fails, angle signal θ27b and angle signal θ30b become unusable for calculating the absolute angle of rotating shaft part 910. However, the absolute angle of rotating shaft part 910 can be calculated by using any one of combinations excluding combinations using angle signal θ27b and/or angle signal θ30b.

Specifically, the absolute angle of rotating shaft part 910 can be calculated using a combination of angle signal θ27a and one of angle signal θ30a, angle signal θ33a, and angle signal θ33b or a combination of angle signal θ30a and one of angle signal θ33a and angle signal θ33b.

Thus, even if a sensor power supply circuit for supplying power to second MR sensor element 27b and second MR sensor element 30b fails, the absolute angle of rotating shaft part 910 can be calculated using any one of five combinations.

Also, FIG. 17 shows combinations of angle signals that are usable for calculating the absolute angle of rotating shaft part 910 when a sensor power supply circuit (fourth sensor power supply circuit 717b in FIG. 12 or second sensor power supply circuit 217b in FIG. 13) for supplying power to first MR sensor element 33a and second MR sensor element 27b fails.

When a sensor power supply circuit for supplying power to first MR sensor element 33a and second MR sensor element 27b fails, angle signal θ27a and angle signal θ33b become unusable for calculating the absolute angle of rotating shaft part 910. However, the absolute angle θ of rotating shaft part 910 can be calculated by using any one of combinations excluding combinations using angle signal θ27a and/or angle signal θ33b.

Specifically, the absolute angle of rotating shaft part 910 can be calculated using a combination of angle signal θ27b and one of angle signal θ30a, angle signal θ30b, and angle signal θ33a, a combination of angle signal θ30a and angle signal θ33a, or a combination of angle signal θ30b and angle signal θ33a.

Thus, even if a sensor power supply circuit for supplying power to first MR sensor element 33a and second MR sensor element 27b fails, the absolute angle of rotating shaft part 910 can be calculated using any one of five combinations.

As described above, even if one of three sensor power supply circuits fails, the absolute angle of rotating shaft part 910 can be calculated using any one of five combinations, and the calculation process of the absolute angle of rotating shaft part 910 and the control of steer-by-wire based on the calculation result can be continued.

Also, control device 1100 includes a function of a failure diagnosis unit that identifies a failure of one of MR sensor elements 27a, 27b, 30a, 30b, 33a, and 33b by comparing calculation results of the absolute angle of rotating shaft part 910, in other words, by comparing the amounts of rotation generated by the rotation amount generating unit with each other.

Here, the failure diagnosis unit of control device 1100 can compare the absolute angles of rotating shaft part 910 calculated based on up to 12 combinations with each other when all of three sensor power supply circuits are operating normally, and can compare the absolute angles of rotating shaft part 910 calculated based on up to five combinations with each other even if one of the three sensor power supply circuits fails.

Also, the failure diagnosis unit of control device 1100 can determine whether there is a failed MR sensor element by comparing detection results of MR sensor elements for detecting the amount of rotation (absolute angle) of the same driven gear.

Thus, the failure diagnosis unit of control device 1100 can widely and accurately detect failures of MR sensor elements.

Next, a failure diagnosis process performed by the failure diagnosis unit of control device 1100 to identify failures of MR sensor elements is described in detail.

Here, respective MCUs 214a, 214b, 714a, and 714b can obtain output signals of all MR sensor elements of first rotation angle detection device 400 and/or output signals of all MR sensor elements of second rotation angle detection device 800 via communication lines between the MCUs and vehicle CAN bus 52, and can perform similar failure detection processes for MR sensor elements 27a, 27b, 30a, 30b, 33a, and 33b constituting first rotation angle detection device 400 or second rotation angle detection device 800.

FIG. 18 through FIG. 21 are flowcharts illustrating a failure diagnosis process for MR sensor elements 27a, 27b, 30a, 30b, 33a, and 33b constituting first rotation angle detection device 400 or second rotation angle detection device 800.

Here, although at least one of MCUs 214a, 214b, 714a, and 714b includes a function of the failure diagnosis unit that performs failure diagnosis of MR sensor elements, in the descriptions below, it is assumed that control device 1100 performs the failure diagnosis process.

First, at step S5001 through step S5006, control device 1100 obtains angle signals θ27a, θ27b, θ30a, θ30b, θ33a, and θ33b from MR sensor elements 27a, 27b, 30a, 30b, 33a, and 33b, respectively.

Next, at step S5007, control device 1100 compares rotation angle data of first driven gear 931 based on angle signal θ27a with rotation angle data of first driven gear 931 based on angle signal θ27b.

Then, when the absolute value of a difference 4027 between the rotation angle data of first driven gear 931 based on angle signal θ27a and the rotation angle data of first driven gear 931 based on angle signal θ27b is greater than or equal to a threshold THθ1 (THθ1>0), control device 1100 proceeds to step S5008 and sets a first sensor failure flag F-27, which indicates whether first angle sensor 951 is faulty, to "1" indicating that a failure of first angle sensor 951 has been detected.

On the other hand, when the absolute value of difference 4027 is less than threshold THθ1, control device 1100 bypasses step S5008 and proceeds to step S5009.

The initial value of first sensor failure flag F-27 is "0" indicating that no failure has been detected for first angle sensor 951. The same applies to a second sensor failure flag F-30 of second angle sensor 952 and a third sensor failure flag F-33 of third angle sensor 953, described later.

At step S5009, control device 1100 compares rotation angle data of second driven gear 932 based on angle signal θ30a with rotation angle data of second driven gear 932 based on angle signal θ30b.

Then, when the absolute value of a difference 4030 between the rotation angle data of second driven gear 932 based on angle signal θ30a and the rotation angle data of second driven gear 932 based on angle signal θ30b is greater than or equal to threshold THθ1, control device 1100 proceeds to step S5010 and sets a second sensor failure flag F-30, which indicates whether second angle sensor 952 is faulty, to "1" indicating that a failure has been detected.

On the other hand, when the absolute value of difference 4030 is less than threshold THθ1, control device 1100 bypasses step S5010 and proceeds to step S5011.

At step S5011, control device 1100 compares rotation angle data of third driven gear 933 based on angle signal θ33a with rotation angle data of third driven gear 933 based on angle signal θ33b.

Then, when the absolute value of a difference 4033 between the rotation angle data of third driven gear 933 based on angle signal θ33a and the rotation angle data of third driven gear 933 based on angle signal θ33b is greater than or equal to threshold THθ1, control device 1100 proceeds to step S5012 and sets a third sensor failure flag F-33, which indicates whether third angle sensor 953 is faulty, to "1" indicating that a failure has been detected.

On the other hand, when the absolute value of difference 4033 is less than threshold THθ1, control device 1100 bypasses step S5012 and proceeds to step S5013.

At each of step S5007, step S5009, and step S5011 described above, control device 1100 compares detection results of MR sensor elements that detect the rotation angle of the same one of driven gears 931, 932, and 933. In the failure diagnosis of angle sensors 951-953, this makes it possible to prevent the accuracy of diagnosis from decreasing due the accuracy and the engagement accuracy of driven gears 931, 932, and 933.

Next, at step S5013 through step S5018 (rotation amount generating unit), control device 1100 performs a process of calculating absolute angles θ1–θ6 of rotating shaft part 910.

First, control device 1100 calculates absolute angle θ1 based on angle signal θ30a and angle signal θ33a at step S5013, and calculates absolute angle θ2 based on angle signal θ33b and angle signal θ27a at next step S5014.

Next, at step S5015, control device 1100 calculates absolute angle θ3 based on angle signal θ27b and angle signal θ30b.

Here, at each of steps S5013 through S5015 described above, control device 1100 obtains one of absolute angles θ1–θ3 based on a combination of outputs of two MR sensor elements to which power is supplied from the same sensor power supply circuit.

Furthermore, control device 1100 calculates absolute angle θ4 based on angle signal θ30b and angle signal θ33b at step S5016, and calculates absolute angle θ5 based on angle signal θ33a and angle signal θ27b at next step S5017.

Next, at step S5018, control device 1100 calculates absolute angle θ6 based on angle signal θ27a and angle signal θ30a.

Here, at each of steps S5016 through S5018 described above, control device 1100 obtains one of absolute angles θ4-θ6 based on a combination of outputs of two MR sensor elements to which power is supplied from different sensor power supply circuits.

Next, control device 1100 proceeds to step S5019 and determines whether first sensor failure flag F-27 has been set to "1".

As described above, when the detection result of first MR sensor element 27a and the detection result of second MR sensor element 27b do not match each other, first sensor failure flag F-27 is set to "1".

When first sensor failure flag F-27 has been set to "1", control device 1100 proceeds to step S5020.

At step S5020, control device 1100 determines whether one of a first condition and a second condition is satisfied, the first condition requiring that the absolute value of the difference between absolute angle θ1 and absolute angle θ2 be greater than or equal to a threshold THθ2, and the second condition requiring that the absolute value of the difference between absolute angle θ1 and absolute angle θ3 be greater than or equal to threshold THθ2. Then, when the first condition (|θ1−θ2|≥THθ2) or the second condition (|θ1−θ3|≥THθ2) is satisfied, control device 1100 proceeds to step S5021; and otherwise, control device 1100 proceeds to step S5022.

At step S5021, control device 1100 determines whether the absolute value of the difference between absolute angle θ1 and absolute angle θ2 is greater than the absolute value of the difference between absolute angle θ1 and absolute angle θ3.

When the absolute value of the difference between absolute angle θ1 and absolute angle θ2 is greater than the absolute value of the difference between absolute angle θ1 and absolute angle θ3, i.e., when |θ1−θ2|>|θ1−θ3| is satisfied, control device 1100 proceeds to step S5024.

At step S5024, control device 1100 identifies the failure of first MR sensor element 27a among two MR sensor elements 27a and 27b constituting first angle sensor 951, in other words, identifies an error in absolute angle θ2 due to an error in angle signal θ27a.

When the failure of first MR sensor element 27a is identified, control device 1100 stores history of diagnosing the failure of first MR sensor element 27a in a non-volatile memory, and also makes a setting so that the detection result of first MR sensor element 27a is not used to control steer-by-wire.

Control device 1100 also performs a similar process when a failure of any other MR sensor element is identified.

On the other hand, when the condition that the absolute value of the difference between absolute angle θ1 and absolute angle θ2 is greater than the absolute value of the difference between absolute angle θ1 and absolute angle θ3 is not satisfied, i.e., when |θ1−θ2|≤|θ1−θ3| is satisfied, control device 1100 proceeds to step S5025.

At step S5025, control device 1100 identifies the failure of second MR sensor element 27b among two MR sensor elements 27a and 27b constituting first angle sensor 951, in other words, an error in absolute angle θ3 due to an error in angle signal θ27b.

Also, when proceeding to step S5022, control device 1100 determines whether one of a first condition and a second condition is satisfied, the first condition requiring that the absolute value of the difference between absolute angle θ4 and absolute angle θ5 be greater than or equal to threshold THθ2, and the second condition requiring that the absolute value of the difference between absolute angle θ4 and absolute angle θ6 be greater than or equal to threshold THθ2.

When the first condition (|θ4−θ5|≥THθ2) or the second condition (|θ4−θ6|≥THθ2) is satisfied, control device 1100 proceeds to step S5023; otherwise, control device 1100 ends this routine.

At step S5023, control device 1100 determines whether the absolute value of the difference between absolute angle θ4 and absolute angle θ5 is greater than the absolute value of the difference between absolute angle θ4 and absolute angle θ6.

When the absolute value of the difference between absolute angle θ4 and absolute angle θ5 is greater than the absolute value of the difference between absolute angle θ4 and absolute angle θ6, i.e., when |θ4−θ5|>|θ4−θ6| is satisfied, control device 1100 proceeds to step S5025 and identifies the failure of second MR sensor element 27b.

On the other hand, when the condition that the absolute value of the difference between absolute angle θ4 and absolute angle θ5 is greater than the absolute value of the difference between absolute angle θ4 and absolute angle θ6 is not satisfied, i.e., when |θ4−θ5|≤|θ4−θ6| is satisfied, control device 1100 proceeds to step S5024 and identifies the failure of first MR sensor element 27a.

Also, when it is determined at step S5019 that first sensor failure flag F-27 has not been set to "1", i.e., when the detection result of first MR sensor element 27a and the detection result of second MR sensor element 27b are substantially the same, control device 1100 proceeds to step S5026.

At step S5026, control device 1100 determines whether second sensor failure flag F-30 has been set to "1".

When second sensor failure flag F-30 has been set to "1", i.e., when the detection result of first MR sensor element 30a and the detection result of second MR sensor element 30b do not match each other, control device 1100 performs steps S5027 through S5032 to determine which one of first MR sensor element 30a and second MR sensor element 30b constituting second angle sensor 952 is faulty.

At steps S5027 through S5032, which one of first MR sensor element 30a and second MR sensor element 30b is faulty is determined by a process similar to steps S5020 through S5025.

First, at step S5027, control device 1100 determines whether one of a first condition (|θ1−θ2|≥THθ2) and a second condition (|θ2−θ3|≥THθ2) is satisfied.

When the first condition (|θ1−θ2|≥THθ2) or the second condition (|θ2−θ3|≥THθ2) is satisfied, control device 1100 proceeds to step S5028 to determine whether |θ1−θ2|>|θ2−θ3| is satisfied.

When |θ1−θ2|>|θ2−θ3| is satisfied, control device 1100 proceeds to step S5031 and identifies the failure of first MR sensor element 30a; and when |θ1−θ2|>|θ2−θ3| is not satisfied, control device 1100 proceeds to step S5032 and identifies the failure of second MR sensor element 30b.

Also, when determining at step S5027 that neither the first condition (|θ1−θ2|≥THθ2) nor the second condition (|θ2−θ3|≥THθ2) is satisfied, control device 1100 proceeds to step S5029.

At step S5029, control device 1100 determines whether one of a first condition (|θ4−θ5|≥THθ2) and a second condition (|θ5−θ6|≥THθ2) is satisfied.

When the first condition (|θ4−θ5|≥THθ2) or the second condition (|θ5−θ6|≥THθ2) is satisfied, control device 1100 proceeds to step S5030; otherwise, control device 1100 ends this routine.

At step S5030, control device 1100 determines whether |θ5−θ6|>|θ4−θ5| is satisfied.

When |θ5−θ6|>|θ4−θ5| is satisfied, control device 1100 proceeds to step S5032 and identifies the failure of second MR sensor element 30*b*; and when |θ5−θ6|>|θ4−θ5| is not satisfied, control device 1100 proceeds to step S5031 and identifies the failure of first MR sensor element 30*a*.

On the other hand, when determining at step S5026 that second sensor failure flag F-30 has not been set to "1", i.e., when the detection result of first MR sensor element 30*a* and the detection result of second MR sensor element 30*b* are substantially the same, control device 1100 proceeds to step S5033.

At step S5033, the control device 1100 determines whether third sensor failure flag F-33 has been set to "1".

When third sensor failure flag F-33 has been set to "1", i.e., when the detection result of first MR sensor element 33*a* and the detection result of second MR sensor element 33*b* do not match each other, control device 1100 performs steps S5034 through S5039 to determine which one of first MR sensor element 33*a* and second MR sensor element 33*b* constituting third angle sensor 953 is faulty.

At steps S5034 through S5039, which one of first MR sensor element 33*a* and second MR sensor element 33*b* is faulty is determined by a process similar to steps S5020 through S5025.

First, at step S5034, control device 1100 determines whether one of a first condition (|θ1−θ3|≥THθ2) and a second condition (|θ2−θ3|≥THθ2) is satisfied.

When the first condition (|θ1−θ3|≥THθ2) or the second condition (|θ2−θ3|≥THθ2) is satisfied, control device 1100 proceeds to step S5035 to determine whether |θ1−θ3|>|θ2−θ3| is satisfied.

When |θ1−θ3|>|θ2−θ3| is satisfied, control device 1100 proceeds to step S5038 and identifies the failure of first MR sensor element 33*a*; and when |θ1−θ3|>|θ2−θ3| is not satisfied, control device 1100 proceeds to step S5039 and identifies the failure of second MR sensor element 33*b*.

When neither the first condition (|θ1−θ3|≥THθ2) nor the second condition (|θ2−θ3|≥THθ2) is satisfied at step S5034, control device 1100 proceeds to step S5036.

At step S5036, control device 1100 determines whether one of a first condition (|θ4−θ6|≥THθ2) and a second condition (|θ5−θ6|≥THθ2) is satisfied.

When the first condition (|θ4−θ6|≥THθ2) or the second condition (|θ5−θ6|≥THθ2) is satisfied, control device 1100 proceeds to step S5037; otherwise, control device 1100 ends this routine.

At step S5037, control device 1100 determines whether |θ5−θ6|>|θ4−θ6| is satisfied.

When |θ5−θ6|>|θ4−θ6| is satisfied, control device 1100 proceeds to step S5039 and identifies the failure of second MR sensor element 33*b*; and when |θ5−θ6|>|θ4−θ6| is not satisfied, control device 1100 proceeds to step S5038 and identifies the failure of first MR sensor element 33*a*.

On the other hand, when it is determined at step S5033 that third sensor failure flag F-33 has not been set to "1", i.e., when the detection result of first MR sensor element 33*a* and the detection result of second MR sensor element 33*b* are substantially the same, control device 1100 ends this routine.

In the failure diagnosis process illustrated by the flowcharts of FIG. 18 through FIG. 21, control device 1100 (failure diagnosis unit) compares absolute angles detected by two MR sensor elements that are among MR sensor elements 27*a*, 27*b*, 30*a*, 30*b*, 33*a*, and 33*b* and for detecting the absolute angles (the amounts of rotation) of the same driven gear.

Then, when the difference between the absolute angles of the same driven gear is greater than or equal to a predetermined value, control device 1100 compares an absolute angle (an amount of rotation) of drive gear 920 generated using a combination including one of the two MR sensor elements that detected the compared absolute angles, with an absolute angle of drive gear 920 generated using a combination including neither one of the two MR sensor elements, and thereby identifies a failure of one of the two MR sensor elements.

Below, diagnostic characteristics in the failure diagnosis of MR sensor elements illustrated in the flowcharts of FIG. 18 through FIG. 21 are described.

Taking the diagnosis of MR sensor elements 27*a* and 27*b* constituting first angle sensor 951 as an example, absolute angle θ2, θ3, θ5, or θ6 calculated using the detection result of a failed sensor element out of MR sensor elements 27*a* and 27*b* differs from absolute angle θ1 or absolute angle θ4 calculated without using the detection results of MR sensor elements 27*a* and 27*b*.

Here, let us assume that MR sensor element 27*b* is operating normally, and MR sensor element 27*a* is faulty.

In this case, because absolute angle θ2 calculated using angle signal θ27*a* becomes an abnormal value, while |θ1−θ2|≥THθ2 is satisfied, absolute angle θ3 calculated using normal angle signal θ27*b* becomes a normal value, and |θ1−θ3|≥THθ2 is not satisfied.

As a result, |θ1−θ2|>|θ1−θ3| is satisfied, and control device 1100 identifies the failure of first MR sensor element 27*a*.

Here, even if one of three sensor power supply circuits for supplying power to first rotation angle detection device 400 or second rotation angle detection device 800 fails, control device 1100 can still calculate absolute angles θ in five different ways as illustrated in FIGS. 15-17.

Also, even if one of three sensor power supply circuits for supplying power to first rotation angle detection device 400 or second rotation angle detection device 800 fails, control device 1100 can compare detection results of one of three combinations of MR sensor elements (MR sensor element 27*a* and MR sensor element 27*b*, MR sensor element 30*a* and MR sensor element 30*b*, and MR sensor element 33*a* and MR sensor element 33*b*), each of the three combinations of MR sensor elements detecting the absolute angle (amount of rotation) of the same driven gear.

For example, in the power supply system for supplying power to first rotation angle detection device 400 illustrated in FIG. 12, even if fourth sensor power supply circuit 717*b* fails, the supply of power to first MR sensor element 30*a* and second MR sensor element 30*b* can be continued.

Therefore, control device 1100 can accurately determine whether second angle sensor 952 is faulty by comparing the detection result of first MR sensor element 30*a* with the detection result of second MR sensor element 30*b* while suppressing the influence of the accuracy and the engagement accuracy of second driven gear 932.

Also, for example, even if fourth sensor power supply circuit 717*b* fails in the power supply system for supplying power to first rotation angle detection device 400 illustrated in FIG. 12, as long as first sensor power supply circuit 217*a* and second sensor power supply circuit 217*b* are operating normally, control device 1100 can calculate absolute angles based on five different combinations that do not use angle signal θ33*b* and angle signal θ27*a* (see FIG. 17).

Therefore, control device 1100 can diagnose the failures of MR sensor elements other than second MR sensor element 33*b* and first MR sensor element 27*a* by comparing absolute angles of drive gear 920 calculated without using angle signal θ33*b* and angle signal θ27*a*.

For example, when the absolute value of the difference between an absolute angle obtained based on a combination including angle signal θ27b and an absolute angle obtained based on a combination not including angle signal θ27b, i.e., a combination of angle signal θ33a and angle signal θ30a or a combination of angle signal θ33a and angle signal θ30b, is greater than or equal to a threshold, and when the absolute value of the difference between an absolute angle obtained based on a combination of angle signal θ33a and angle signal θ30a and an absolute angle obtained based on a combination of angle signal θ33a and angle signal θ30b is less than the threshold, control device 1100 determines that second MR sensor element 27b is faulty (i.e., angle signal θ27b is faulty).

Here, control device 1100 can detect the failure of a sensor power supply circuit by, for example, monitoring an output voltage.

Next, failure diagnosis of MR sensor elements using detection results of motor rotation angle sensors 101 and 601 is described.

Here, although at least one of MCUs 214a, 214b, 714a, and 714b includes a function of a failure diagnosis unit that performs failure diagnosis of MR sensor elements using detection results of motor rotation angle sensors 101 and 601, in the descriptions below, it is assumed that control device 1100 performs a failure diagnosis process.

FIG. 22 through FIG. 25 are flowcharts illustrating a failure diagnosis process for MR sensor elements using detection results of motor rotation angle sensors 101 and 601.

When the ignition switch (in other words, a starter switch or a power switch) of vehicle 1 is turned on at step S6001, control device 1100 obtains, at step S6002 through step S6007, angle signals θ27a, θ27b, θ30a, θ30b, θ33a, and θ33b from MR sensor elements 27a, 27b, 30a, 30b, 33a, and 33b, respectively.

Next, control device 1100 proceeds to step S6008, and obtains information on a motor rotation angle θmot detected by motor rotation angle sensor 101 of electric motor 100 when diagnosing first rotation angle detection device 400 or obtains information on a motor rotation angle θmot detected by motor rotation angle sensor 601 of electric motor 600 when diagnosing second rotation angle detection device 800.

Here, each of motor rotation sensors 101 and 601 is implemented by, for example, a resolver, and outputs an analog signal that is a position signal corresponding to the rotational position of a rotor.

Next, at step S6009 through step S6014 (rotation amount generating unit), control device 1100 calculates absolute angles θ1-θ6 of rotating shaft part 910.

Control device 1100 calculates absolute angle θ1 based on angle signal θ30a and angle signal θ33a at step S6009, and calculates absolute angle θ2 based on angle signal θ33b and angle signal θ27a at next step S6010.

Also, control device 1100 calculates absolute angle θ3 based on angle signal θ27b and angle signal θ30b at step S6011, and calculates absolute angle θ4 based on angle signal θ30b and angle signal θ33b at next step S6012.

Furthermore, control device 1100 calculates absolute angle θ5 based on angle signal θ33a and angle signal θ27b at step S6013, and calculates absolute angle θ6 based on angle signal θ27a and angle signal θ30a at next step S6014.

Next, control device 1100 proceeds to step S6015 and determines whether this is the first time proceeding to step S6015 after the ignition switch is turned on.

When this is the first time proceeding to step S6015, control device 1100 proceeds from step S6015 to step S6016 and calculates an offset amount θosmot of the motor rotation angle.

Figure 26:
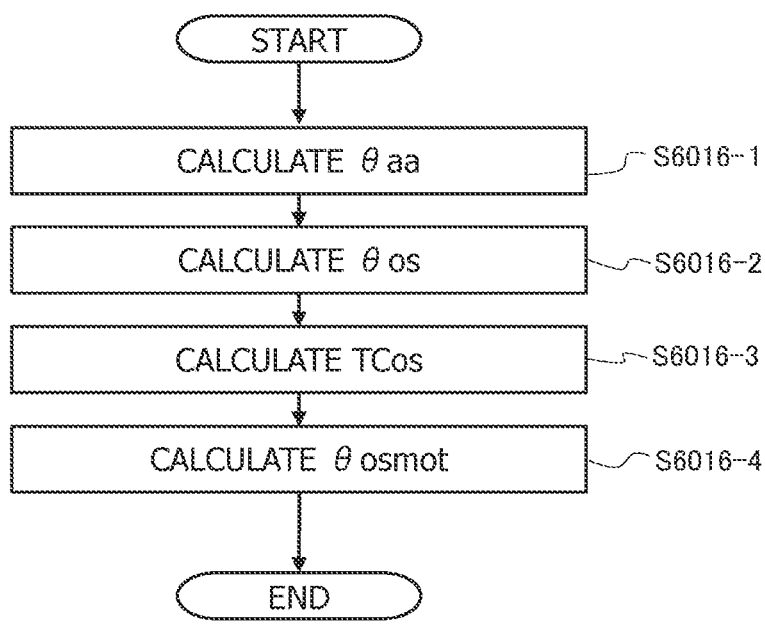
FIG. 26 is a flowchart illustrating a process of calculating an offset amount θosmot of a motor rotation angle.

FIG. 26 is a flowchart illustrating the details of the calculation process of offset amount θosmot at step S6016.

At step S6016-1, control device 1100 calculates an average value θaa (θaa=(θ1+θ2+θ3+θ4+θ5+θ6)/6) of absolute angles θ1–θ6 of rotating shaft part 910 obtained at step S6009 through step S6014.

Next, control device 1100 proceeds to step S6016-2 and calculates an offset amount Dos based on average value θaa obtained at step S6016-1, motor rotation angle θmot (θmot: 0 deg.-360 deg.), and a gear ratio Kg of a speed reducer, which reduces the speed of rotation of electric motor 100 or electric motor 600 and transmits the rotation with the reduced speed to rotating shaft part 910.

Offset amount θos corresponds to the difference between an accumulated motor rotation angle corresponding to average value θaa of the absolute angles and motor rotation angle θmot, and the sum of offset amount θos and motor rotation angle θmot corresponds to the accumulated motor rotation angle corresponding to average value θaa of the absolute angles.

That is, equation (1) below is satisfied.

$$\theta aa = (\theta mot + \theta os) \times Kg \tag{1}$$

Accordingly, offset amount θos can be obtained by equation (2) below.

$$\theta os = \theta aa / Kg - \theta mot \tag{2}$$

Next, control device 1100 proceeds to step S6016-3, and calculates a motor rotation count TCos, which indicates the number of rotations of the motor corresponding to offset amount θos, according to equation (3) below.

$$T\cos = |\theta os| / 360 \tag{3}$$

Here, motor rotation count TCos is represented by the quotient obtained by equation (3).

Next, control device 1100 proceeds to step S6016-4 and calculates an offset amount θosmot (in other words, a correction value for calibration) used to obtain the absolute angle of rotating shaft part 910 based on a motor rotation angle.

Here, offset amount θosmot corresponds to the remainder of division in formula (3), and formula (4) below is satisfied.

$$\theta os = T\cos \times 360 + \theta osmot \tag{4}$$

Accordingly, offset amount θosmot is obtained by formula (5) below.

$$\theta osmot = \theta os - T\cos \times 360 \tag{5}$$

After obtaining offset amount θosmot at step S6016 or when determining at step S6015 that it is not the first time, control device 1100 proceeds to step S6017.

Then, at step S6017, control device 1100 calculates, based on motor rotation angle θmot, a motor rotation count TC used to obtain the absolute angle of rotating shaft part 910.

Figure 27:
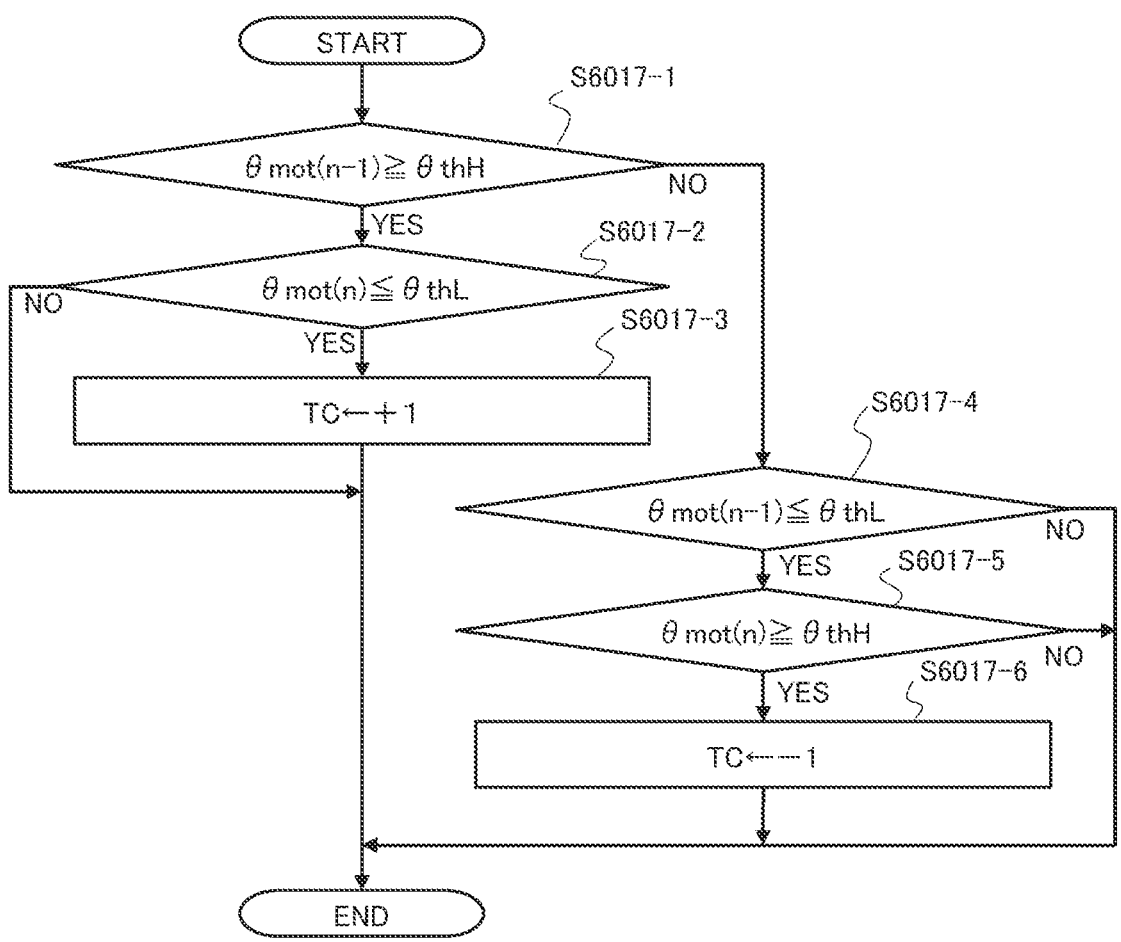
FIG. 27 is a flowchart illustrating a process of calculating a motor rotation count TC.

FIG. 27 is a flowchart illustrating a process of calculating motor rotation count TC at step S6017.

At step S6017-1, control device 1100 compares a previous value θmot (n−1) of motor rotation angle θmot with a high threshold θthH.

Control device 1100 reads data of motor rotation angle θmot at regular time intervals, and stores the read data of motor rotation angle θmot in a memory in chronological order.

Here, previous value θmot (n−1) is a value that is read at a read timing immediately before the read timing at which current motor rotation angle θmot (current value θmot (n)) is read.

When determining at step S6017-1 that previous value θmot (n−1) is greater than or equal to high threshold θthH, control device 1100 proceeds to step S6017-2 and compares current value θmot (n) with a low threshold θthL (0 deg.<θthL<θthH<360 deg.).

When current value θmot (n) is less than or equal to low threshold θthL, control device 1100 determines that the motor rotation angle has increased across the rotational position of 360 degrees, and proceeds to step S6017-3 to update motor rotation count TC by increasing motor rotation count TC by 1 from the previous value.

On the other hand, when determining that current value θmot (n) is greater than low threshold θthL, control device 1100 bypasses step S6017-3 and ends this routine.

Also, when determining at step S6017-1 that previous value θmot (n−1) is less than high threshold θthH, control device 1100 proceeds to step S6017-4.

At step S6017-4, control device 1100 compares previous value θmot (n−1) with low threshold θthL.

When previous value θmot (n−1) is less than or equal to low threshold θthL, control device 1100 proceeds to step S6017-5, and compares current value θmot (n) with high threshold θthH.

Here, when current value θmot (n) is greater than or equal to high threshold θthH, control device 1100 determines that the motor rotation angle has decreased across the rotational position of 360 degrees, and proceeds to step S6017-6 to update motor rotation count TC by decreasing motor rotation count TC by 1 from the previous value.

On the other hand, when determining at step S6017-4 that previous value θmot (n−1) is greater than low threshold θthL, control device 1100 ends this routine. Also, when determining at steps S6017-5 that current value θmot (n) is less than high threshold θthH, control device 1100 ends this routine.

After updating motor rotation count TC at step S6017, control device 1100 proceeds to step S6018 (rotating-shaft-part rotation angle generating unit) and calculates absolute angle θamot of rotating shaft part 910 according to equation (6) below based on motor rotation angle θmot, motor rotation count TC, and offset amount θosmot.

$$\theta amot=(\theta mot+TC\times 360+\theta osmot)\times Kg \quad (6)$$

Next, control device 1100 proceeds to step S6019 and compares rotation angle data of first driven gear 931 based on angle signal θ27a with rotation angle data of first driven gear 931 based on angle signal θ27b.

When the absolute value of a difference 4027 between the rotation angle data of first driven gear 931 based on angle signal θ27a and the rotation angle data of first driven gear 931 based on angle signal θ27b is greater than or equal to threshold TH01, control device 1100 proceeds to step S6020 and subsequent steps and determines whether the failure of first angle sensor 951 is due to the failure of first MR sensor element 27a or due to the failure of second MR sensor element 27b.

At step S6020, control device 1100 determines whether one of a first condition and a second condition is satisfied, the first condition requiring that the absolute value of the difference between absolute angle θ2 calculated based on angle signal θ33b and angle signal θ27a and absolute angle θamot obtained based on motor rotation angle θmot be greater than or equal to threshold TH02, and the second condition requiring that the absolute value of the difference between absolute angle θ6 calculated based on angle signal θ27a and angle signal θ30a and absolute angle θamot obtained based on motor rotation angle θmot be greater than or equal to threshold TH02.

When the first condition (|θ2 −θamot|≥TH02) or the second condition (|θ6−θamot|≥TH02) is satisfied, control device 1100 proceeds to step S6021 and identifies the failure of first MR sensor element 27a.

On the other hand, when neither the first condition (|θ2−θamot|≥TH02) nor the second condition (|θ6−θamot|≥TH02) is satisfied, control device 1100 proceeds to step S6022.

At step S6022, control device 1100 determines whether one of a first condition and a second condition is satisfied, the first condition requiring that the absolute value of the difference between absolute angle θ3 calculated based on angle signal θ27b and angle signal θ30b and absolute angle θamot obtained based on motor rotation angle θmot be greater than or equal to threshold TH02, and the second condition requiring that the absolute value of the difference between absolute angle θ5 calculated based on angle signal θ33a and angle signal θ27b and absolute angle θamot obtained based on motor rotation angle θmot be greater than or equal to threshold TH02.

When the first condition (|θ3−θamot|≥TH02) or second condition (|θ5−θamot|≥TH02) is satisfied, control device 1100 proceeds to step S6023 and identifies the failure of second MR sensor element 27b.

On the other hand, when determining at step S6019 that the absolute value of difference Δθ27 is less than threshold TH01, in other words, when the failure of first angle sensor 951 is not detected, control device 1100 bypasses step S6020 through step S6023 and proceeds to step S6024.

Also, when it is determined at step S6022 that neither the first condition (|θ3−θamot|≥TH02) nor the second condition (|θ5−θamot|≥TH02) is satisfied, control device 1100 bypasses step S6023 and proceeds to step S6024.

At step S6024, control device 1100 compares rotation angle data of second driven gear 932 based on angle signal θ30a with rotation angle data of second driven gear 932 based on angle signal θ30b.

When the absolute value of difference 4030 between the rotation angle data of second driven gear 932 based on angle signal θ30a and the rotation angle data of second driven gear 932 based on angle signal θ30b is greater than or equal to threshold TH01, control device 1100 proceeds to step S6025 and subsequent steps and determines whether the failure of second angle sensor 952 is due to the failure of first MR sensor element 30a or due to the failure of second MR sensor element 30b.

At step S6025, control device 1100 determines whether one of a first condition and a second condition is satisfied, the first condition requiring that the absolute value of the difference between absolute angle θ1 calculated based on angle signal θ30a and angle signal θ33a and absolute angle θamot obtained based on motor rotation angle θmot be greater than or equal to threshold TH02, and the second condition requiring that the absolute value of the difference between absolute angle θ6 calculated based on angle signal θ27a and angle signal θ30a and absolute angle θamot obtained based on motor rotation angle θmot be greater than threshold TH02.

When the first condition (|θ1−θamot|≥TH02) or the second condition (|θ6−θamot|≥TH02) is satisfied, control device 1100 proceeds to step S6026 and identifies the failure of first MR sensor element 30a.

On the other hand, when neither the first condition (|θ1−θamot|≥TH θ2) nor the second condition (|θ6−θamot|≥TH θ2) is satisfied, control device 1100 proceeds to step S6027.

At step S6027, control device 1100 determines whether one of a first condition and a second condition is satisfied, the first condition requiring that the absolute value of the difference between absolute angle θ3 calculated based on angle signal θ27b and angle signal θ30b and absolute angle θamot obtained based on motor rotation angle θmot be greater than or equal to threshold TH θ2, and the second condition requiring that the absolute value of the difference between absolute angle θ4 calculated based on angle signal θ30b and angle signal θ33b and absolute angle θamot obtained based on motor rotation angle θmot be greater than or equal to threshold TH θ2.

When the first condition (|θ3−θamot|≥TH θ2) or the second condition (|θ4−θamot|≥TH θ2) is satisfied, control device 1100 proceeds to step S6028 and identifies the failure of second MR sensor element 30b.

On the other hand, when determining at step S6024 that the absolute value of difference Δθ30 is less than threshold TH θ1, in other words, when the failure of second angle sensor 952 is not detected, control device 1100 bypasses step S6025 through step S6028 and proceeds to step S6029.

Also, when it is determined at step S6027 that neither the first condition (|θ3−θamot|≥TH θ2) nor the second condition (|θ4−θamot|≥TH θ2) is satisfied, control device 1100 bypasses step S6028 and proceeds to step S6029.

At step S6029, control device 1100 compares rotation angle data of third driven gear 933 based on angle signal θ33a with rotation angle data of third driven gear 933 based on angle signal θ33b.

When the absolute value of difference Δθ33 between the rotation angle data of third driven gear 933 based on angle signal θ33a and the rotation angle data of third driven gear 933 based on angle signal θ33b is greater than or equal to threshold TH θ1, control device 1100 proceeds to step S6030 and subsequent steps and determines whether the failure of third angle sensor 953 is due to the failure of first MR sensor element 33a or due to the failure of second MR sensor element 33b.

At step S6030, control device 1100 determines whether one of a first condition and a second condition is satisfied, the first condition requiring that the absolute value of the difference between absolute angle θ1 calculated based on angle signal θ30a and angle signal θ33a and absolute angle θamot obtained based on motor rotation angle θmot be greater than or equal to threshold TH θ2, and the second condition requiring that the absolute value of the difference between absolute angle θ5 calculated based on angle signal θ33a and angle signal θ27b and absolute angle θamot obtained based on motor rotation angle θmot be greater than or equal to threshold TH θ2.

When the first condition (|θ1−θamot|≥TH θ2) or the second condition (|θ5−θamot|≥TH θ2) is satisfied, control device 1100 proceeds to step S6031 and identifies the failure of first MR sensor element 33a.

On the other hand, when neither the first condition (|θ1−θamot|≥TH θ2) nor the second condition (|θ5−θamot|≥TH θ2) is satisfied, control device 1100 proceeds to step S6032.

At step S6032, control device 1100 determines whether one of a first condition and a second condition is satisfied, the first condition requiring that the absolute value of the difference between absolute angle θ2 calculated based on angle signal θ33b and angle signal θ27a and absolute angle θamot obtained based on motor rotation angle θmot be greater than or equal to threshold TH θ2, and the second condition requiring that the absolute value of the difference between absolute angle θ4 calculated based on angle signal θ30b and angle signal θ33b and absolute angle θamot obtained based on motor rotation angle θmot be greater than or equal to threshold TH θ2.

When the first condition (|θ2−θamot|≥TH θ2) or the second condition (|θ4−θamot|≥TH θ2) is satisfied, control device 1100 proceeds to step S6033 and identifies the failure of second MR sensor element 33b.

On the other hand, when it is determined at step S6029 that the absolute value of difference Δθ33 is less than threshold TH θ1, in other words, when the failure of third angle sensor 953 is not detected, control device 1100 bypasses step S6030 through step S6033 and proceeds to step S6034.

Also, when it is determined at step S6032 that neither the first condition (|θ2−θamot|≥TH θ2) nor the second condition (|θ4−θamot|≥TH θ2) is satisfied, control device 1100 bypasses step S6033 and proceeds to step S6034.

At step S6034, control device 1100 determines whether the ignition switch has been switched from the ON state to the OFF state.

When the ignition switch is kept in the ON state, control device 1100 returns to step S6002 and repeats the failure diagnosis process.

On the other hand, when the ignition switch has been switched from the ON state to the OFF state, control device 1100 ends this routine.

According to the failure diagnosis process (failure diagnosis unit) illustrated in the flowcharts of FIG. 22 through FIG. 25 for identifying failures of MR sensor elements using detection results of motor rotation angle sensors 101 and 601, the absolute angle of rotating shaft part 910 obtained based on each combination of detection results of MR sensor elements is compared with absolute angle θamot obtained based on motor rotation angle θmot to identify the failure of one of MR sensor elements 27a, 27b, 30a, 30b, 33a, and 33b.

In other words, control device 1100 compares the amounts of rotation (absolute angles θ1–θ6) generated by the rotation amount generating unit with the amount of rotation (absolute angle θamot) generated by the rotating-shaft-part rotation angle generating unit to identify the failure of one of MR sensor elements 27a, 27b, 30a, 30b, 33a, and 33b.

Accordingly, even if one of the three sensor power supply circuits for supplying power to first rotation angle detection device 400 or second rotation angle detection device 800 fails, control device 1100 can determine whether there is an error in absolute angles obtained by using detection results of MR sensor elements to which power is continued to be supplied, and can thereby evaluate the reliability of each of the MR sensor elements to which power is continued to be supplied.

Also, even if one of the three sensor power supply circuits for supplying power to first rotation angle detection device 400 or second rotation angle detection device 800 fails, it is possible to evaluate the reliability of two MR sensor elements to which power continues to be supplied, by comparing an absolute angle obtained by combining detection results of the two MR sensor elements to which power continues to be supplied, with absolute angle θamot obtained based on motor rotation angle θmot.

The technical ideas described in the above embodiment may be used in any appropriate combination as long as they do not conflict with each other.

Although the present invention is specifically described above with reference to a preferred embodiment, it is apparent to one skilled in the art that variations of the embodiment can be made based on the basic technical concept and the teachings of the present invention.

For example, steer-by-wire steering system 1000 may be configured to include a backup mechanism that mechanically couples steering wheel 500 to steered road wheels 2L and 2R via, for example, a clutch.

Also, only one of first rotation angle detection device 400 and second rotation angle detection device 800 may be configured to include first through sixth sensors and to be powered by three power supply circuits.

Furthermore, control device 1100 may be configured to include first ECU 200 and second ECU 700 that are integrally provided in one housing.

In the above embodiment, each of angle sensors 951, 952, and 953 is a dual die including two MR sensor elements. Alternatively, the system may include six angle sensors, each of which is a single die including one MR sensor element.

According to a preferred embodiment, there is provided a rotation angle detection device that detects a steering state quantity of steer-by-wire. The rotation angle detection device includes a rotating shaft part that rotates around a rotational axis; a rotation angle detector including a drive gear that rotates along with rotation of the rotating shaft part, a first driven gear, a second driven gear, and a third driven gear that rotate in conjunction with the drive gear, the numbers of teeth of the first driven gear, the second driven gear, and the third driven gear being different from each other and indivisible by each other, a first magnet provided on the first driven gear, a second magnet provided on the second driven gear, a third magnet provided on the third driven gear, a first sensor and a second sensor that are disposed to face the first magnet and detect an amount of rotation of the first driven gear, a third sensor and a fourth sensor that are disposed to face the second magnet and detect an amount of rotation of the second driven gear, and a fifth sensor and a sixth sensor that are disposed to face the third driven magnet and detect an amount of rotation of the third driven gear; and a control device that, based on an amount of rotation of the rotating shaft part, outputs a signal used to control the steer-by-wire. The control device includes a rotation amount generating unit that generates an amount of rotation of the drive gear based on detection values from a combination of sensors different from any one of a combination of the first sensor and the second sensor, a combination of the third sensor and the fourth sensor, and a combination of the fifth sensor and the sixth sensor; and a first power supply circuit, a second power supply circuit, and a third power supply circuit each of which supplies power to one or more of the first sensor, the second sensor, the third sensor, the fourth sensor, the fifth sensor, and the sixth sensor. The first power supply circuit includes a first power supply that supplies power to a sensor among the first sensor, the second sensor, the third sensor, the fourth sensor, the fifth sensor, and the sixth sensor; and a second power supply that supplies power to a sensor that is different from the sensor to which power is supplied from the first power supply and detects the amount of rotation of a driven gear different from a driven gear the amount of rotation of which is detected by the sensor to which power is supplied from the first power supply. The second power supply circuit includes a third power supply that supplies power to a sensor among the first sensor, the second sensor, the third sensor, the fourth sensor, the fifth sensor, and the sixth sensor; and a fourth power supply that supplies power to a sensor that is different from the sensor to which power is supplied from the third power supply and detects the amount of rotation of a driven gear different from a driven gear the amount of rotation of which is detected by the sensor to which power is supplied from the third power supply. The third power supply circuit includes a fifth power supply that supplies power to a sensor among the first sensor, the second sensor, the third sensor, the fourth sensor, the fifth sensor, and the sixth sensor; and a sixth power supply that supplies power to a sensor that is different from the sensor to which power is supplied from the first power supply and detects the amount of rotation of a driven gear different from a driven gear the amount of rotation of which is detected by the sensor to which power is supplied from the first power supply.

This makes it possible to provide triple-redundant power supply circuits and to calculate the amount of rotation of the rotating shaft part based on 12 combinations of signals. This in turn makes it possible to improve robustness and to continue to control the steer-by-wire even when failures occur.

According to another preferred embodiment, the control device includes a first control device and a second control device; and at least one of the first control device and the second control device includes one of the first power supply circuit, the second power supply circuit, and the third power supply circuit.

With this configuration, power is supplied to the rotation angle detection device from multiple control devices, and therefore robustness against power-supply failure is improved.

According to another preferred embodiment, the rotating shaft part, the rotation angle detector, and the first control device are provided in a steering input device of the steer-by-wire; and the steering state quantity is an amount of rotation of a steering wheel provided in the steering input device.

This makes it possible to provide a steer-by-wire system that is safe even when multiple failures occur in the rotation angle detection device.

According to another preferred embodiment, the rotating shaft part, the rotation angle detector, and the second control device are provided in a steering device of the steer-by-wire; and the steering state quantity is an amount related to a steering amount of tires connected to the steering device.

This makes it possible to provide a steer-by-wire system that is safe even when multiple failures occur in the rotation angle detection device.

According to another preferred embodiment, the first power supply circuit is supplied with power from a first battery provided in a vehicle; and the second power supply circuit is supplied with power from a second battery provided in the vehicle.

This makes it possible to continue to detect the absolute angle even if one of the two batteries fails.

According to another preferred embodiment, the third power supply circuit is supplied with power from the first battery or the second battery.

This makes it possible to prevent the number of batteries from increasing.

According to another preferred embodiment, the first driven gear, the second driven gear, and the third driven gear are configured such that quotients obtained by dividing the numbers of teeth of the first driven gear, the second driven gear, and the third driven gear by a greatest common factor represent a ratio of natural numbers including two different odd numbers and one even number.

This makes it possible to detect a wide range of amounts of rotation.

According to another preferred embodiment, the numbers of teeth of the first driven gear, the second driven gear, and the third driven gear are natural number multiples of a ratio 9:10:11 of the numbers of teeth.

This makes it possible to detect a wide range of amount of rotation that is highly practical for the steer-by-wire.

According to another preferred embodiment, the numbers of teeth of the first driven gear, the second driven gear, and the third driven gear are 27, 30, and 33 or 18, 20, and 22, respectively.

This makes it possible to use the rotation angle detection device in a more practical range for the steer-by-wire.

According to another preferred embodiment, the number of teeth of the drive gear is greater than or equal to twice the number of teeth of one of the first driven gear, the second driven gear, and the third driven gear that has a smallest number of teeth.

This makes it possible to detect up to five rotations (2.5 rotations to the left and right) of the steering wheel and to handle even a small number of rotations to be detected.

According to another preferred embodiment, the first driven gear, the second driven gear, and the third driven gear mesh with the drive gear.

With this configuration, because all of the driven gears mesh with the drive gear, it is possible to accurately detect the amount of rotation.

According to another preferred embodiment, the first driven gear meshes with the drive gear, the second driven gear meshes with the first driven gear, and the third driven gear meshes with one of the drive gear, the first driven gear, and the second driven gear.

This configuration makes it possible to detect the amount of rotation that is equivalent to the amount of rotation detected with the configuration in which the first driven gear, the second driven gear, and the third driven gear mesh with the drive gear.

According to another preferred embodiment, the control device includes a failure diagnosis unit that identifies a failure of one of the first sensor, the second sensor, the third sensor, the fourth sensor, the fifth sensor, and the sixth sensor by comparing amounts of rotation generated by the rotation amount generating unit with each other.

This makes it possible to calculate the absolute angle of the rotating shaft part based on 12 combinations of signals and thereby makes it possible to increase a failure detection range by majority voting in which two or more values are compared.

According to another preferred embodiment, the control device includes a failure diagnosis unit that compares amounts of rotation detected by two sensors among the first sensor, the second sensor, the third sensor, the fourth sensor, the fifth sensor, and the sixth sensor with each other, the two sensors detecting the amounts of rotation of a same driven gear; and when a difference between the amounts of rotation is greater than or equal to a predetermined value, compares the amount of rotation of the drive gear generated by the rotation amount generating unit based on a combination including one of the two sensors with the amount of rotation of the drive gear generated by the rotation amount generating unit based on a combination that does not include both of the two sensors to identify a failure of one of the two sensors.

With this configuration, because the amounts of rotation corresponding to the same driven gear are first compared with each other, the failure detection accuracy can be improved. This also makes it possible to reduce the effects of accuracy and engagement accuracy of the driven gears.

According to another preferred embodiment, when one of the first power supply circuit, the second power supply circuit, and the third power supply circuit fails, the failure diagnosis unit of the control device identifies a failure of one of the first sensor, the second sensor, the third sensor, the fourth sensor, the fifth sensor, and the sixth sensor.

This makes it possible to calculate the amount of rotation based on five combinations even if one of the power supply circuits fails. Also, because one combination of two sensors for the same driven gear remains, and the amounts of rotation corresponding to the same driven gear are first compared with each other, the failure detection accuracy can be improved.

According to another preferred embodiment, the steer-by-wire includes an electric motor; and the control device includes a rotating-shaft-part rotation angle generating unit that generates the amount of rotation of the rotating shaft part based on an amount of rotation of the electric motor, and a failure diagnosis unit that when one of the first power supply circuit, the second power supply circuit, and the third power supply circuit fails, compares the amount of rotation generated by the rotation amount generating unit with the amount of rotation generated by the rotating-shaft-part rotation angle generating unit to identify a failure of one of the first sensor, the second sensor, the third sensor, the fourth sensor, the fifth sensor, and the sixth sensor.

Even if a power supply circuit fails, this configuration makes it possible to evaluate the reliability of signals of remaining sensors by using the rotation angle of the electric motor.

According to another preferred embodiment, when another one of the first power supply circuit, the second power supply circuit, and the third power supply circuit additionally fails, the failure diagnosis unit compares the amount of rotation generated by the rotation amount generating unit with the amount of rotation generated by the rotating-shaft-part rotation angle generating unit to identify a failure of one of the first sensor, the second sensor, the third sensor, the fourth sensor, the fifth sensor, and the sixth sensor.

This makes it possible to evaluate the reliability of signals of sensors even if two power supply circuits fail.

REFERENCE SYMBOL LIST

1 . . . vehicle; 2L, 2R . . . steered road wheel; 100 . . . electric motor; 200 . . . first ECU; 214a, 214b . . . MCU; 217a, 217b, 717a, 717b . . . sensor power supply circuit; 300 . . . steering mechanism; 400 . . . first rotation angle detection device (rotation angle detector); 500 . . . steering wheel; 600 . . . electric motor; 700 . . . second ECU; 714a, 714b MCU; 800 . . . second rotation angle detection device (rotation angle detector); 910 . . . rotating shaft part; 920 . . . drive gear; 931, 932, 933 . . . driven gear; 941, 942, 943 . . . magnet; 951, 952, 953 . . . angle sensor; 27a, 27b, 30a, 30b, 33a, 33b . . . MR sensor element; 1000 . . . steer-by-wire steering system; 1100 . . . control device; 2000 . . . steering device; 3000 . . . steering input device

The invention claimed is:

1. A rotation angle detection device that detects a steering state quantity of a steer-by-wire steering system including an electric motor, the rotation angle detection device comprising:
a rotating shaft part that rotates around a rotational axis;
a rotation angle detector including
a drive gear that rotates along with rotation of the rotating shaft part,
a first driven gear, a second driven gear, and a third driven gear that rotate in conjunction with the drive gear, numbers of teeth of the first driven gear, the second driven gear, and the third driven gear being different from each other and indivisible by each other,
a first magnet provided on the first driven gear,
a second magnet provided on the second driven gear,
a third magnet provided on the third driven gear,
a first sensor and a second sensor that are disposed to face the first magnet and detect an amount of rotation of the first driven gear,
a third sensor and a fourth sensor that are disposed to face the second magnet and detect an amount of rotation of the second driven gear, and
a fifth sensor and a sixth sensor that are disposed to face the third magnet and detect an amount of rotation of the third driven gear; and
a control device that, based on an amount of rotation of the rotating shaft part, outputs a control signal for driving the electric motor of the steer-by-wire steering system, the control device including
a rotation amount generating unit that generates an amount of rotation of the drive gear based on detection values from a combination of sensors different from any one of a combination of the first sensor and the second sensor, a combination of the third sensor and the fourth sensor, and a combination of the fifth sensor and the sixth sensor, and
a first power supply circuit, a second power supply circuit, and a third power supply circuit, each of which supplies power to one or more of the first sensor, the second sensor, the third sensor, the fourth sensor, the fifth sensor, and the sixth sensor; wherein
the first power supply circuit includes
a first power supply that supplies power to a sensor among the first sensor, the second sensor, the third sensor, the fourth sensor, the fifth sensor, and the sixth sensor, and
a second power supply that supplies power to a sensor that is different from the sensor to which power is supplied from the first power supply and detects the amount of rotation of a driven gear different from a driven gear the amount of rotation of which is detected by the sensor to which power is supplied from the first power supply,
the second power supply circuit includes
a third power supply that supplies power to a sensor among the first sensor, the second sensor, the third sensor, the fourth sensor, the fifth sensor, and the sixth sensor, and
a fourth power supply that supplies power to a sensor that is different from the sensor to which power is supplied from the third power supply and detects the amount of rotation of a driven gear different from a driven gear the amount of rotation of which is detected by the sensor to which power is supplied from the third power supply, and the third power supply circuit includes
a fifth power supply that supplies power to a sensor among the first sensor, the second sensor, the third sensor, the fourth sensor, the fifth sensor, and the sixth sensor, and
a sixth power supply that supplies power to a sensor that is different from the sensor to which power is supplied from the first power supply and detects the amount of rotation of a driven gear different from a driven gear the amount of rotation of which is detected by the sensor to which power is supplied from the first power supply.

2. The rotation angle detection device as claimed in claim 1, wherein
the control device includes a first control device and a second control device; and
at least one of the first control device and the second control device includes one of the first power supply circuit, the second power supply circuit, and the third power supply circuit.

3. The rotation angle detection device as claimed in claim 2, wherein
the rotating shaft part, the rotation angle detector, and the first control device are provided in a steering input device of the steer-by-wire steering system; and
the steering state quantity is an amount of rotation of a steering wheel provided in the steering input device.

4. The rotation angle detection device as claimed in claim 2, wherein
the rotating shaft part, the rotation angle detector, and the second control device are provided in a steering device of the steer-by-wire steering system; and
the steering state quantity is an amount related to a steering amount of tires connected to the steering device.

5. The rotation angle detection device as claimed in claim 2, wherein
the first power supply circuit is supplied with power from a first battery provided in a vehicle; and
the second power supply circuit is supplied with power from a second battery provided in the vehicle.

6. The rotation angle detection device as claimed in claim 5, wherein the third power supply circuit is supplied with power from the first battery or the second battery.

7. The rotation angle detection device as claimed in claim 1, wherein the first driven gear, the second driven gear, and the third driven gear are configured such that quotients obtained by dividing the numbers of teeth of the first driven gear, the second driven gear, and the third driven gear by a greatest common factor represent a ratio of natural numbers including two different odd numbers and one even number.

8. The rotation angle detection device as claimed in claim 7, wherein the numbers of teeth of the first driven gear, the second driven gear, and the third driven gear are natural number multiples of a ratio 9:10:11 of the numbers of teeth.

9. The rotation angle detection device as claimed in claim 8, wherein the numbers of teeth of the first driven gear, the second driven gear, and the third driven gear are 27, 30, and 33 or 18, 20, and 22, respectively.

10. The rotation angle detection device as claimed in claim 1, wherein a number of teeth of the drive gear is greater than or equal to twice the number of teeth of one of the first driven gear, the second driven gear, and the third driven gear that has a smallest number of teeth.

11. The rotation angle detection device as claimed in claim 1, wherein the first driven gear, the second driven gear, and the third driven gear mesh with the drive gear.

12. The rotation angle detection device as claimed in claim 1, wherein
the first driven gear meshes with the drive gear,
the second driven gear meshes with the first driven gear, and
the third driven gear meshes with one of the drive gear, the first driven gear, and the second driven gear.

13. The rotation angle detection device as claimed in claim 1, wherein the control device includes a failure diagnosis unit that identifies a failure of one of the first sensor, the second sensor, the third sensor, the fourth sensor, the fifth sensor, and the sixth sensor by comparing amounts of rotation generated by the rotation amount generating unit with each other.

14. The rotation angle detection device as claimed in claim 1, wherein the control device includes a failure diagnosis unit that
compares amounts of rotation detected by two sensors among the first sensor, the second sensor, the third sensor, the fourth sensor, the fifth sensor, and the sixth sensor with each other, the two sensors detecting the amounts of rotation of a same driven gear, and
when a difference between the amounts of rotation is greater than or equal to a predetermined value, compares the amount of rotation of the drive gear generated by the rotation amount generating unit based on a combination including one of the two sensors with the amount of rotation of the drive gear generated by the rotation amount generating unit based on a combination that does not include both of the two sensors to identify a failure of one of the two sensors.

15. The rotation angle detection device as claimed in claim 14, wherein when one of the first power supply circuit, the second power supply circuit, and the third power supply circuit fails, the failure diagnosis unit of the control device identifies a failure of one of the first sensor, the second sensor, the third sensor, the fourth sensor, the fifth sensor, and the sixth sensor.

16. The rotation angle detection device as claimed in claim 1, wherein
the control device includes
a rotating-shaft-part rotation angle generating unit that generates the amount of rotation of the rotating shaft part based on an amount of rotation of the electric motor, and
a failure diagnosis unit that when one of the first power supply circuit, the second power supply circuit, and the third power supply circuit fails, compares the amount of rotation generated by the rotation amount generating unit with the amount of rotation generated by the rotating-shaft-part rotation angle generating unit to identify a failure of one of the first sensor, the second sensor, the third sensor, the fourth sensor, the fifth sensor, and the sixth sensor.

17. The rotation angle detection device as claimed in claim 16, wherein when another one of the first power supply circuit, the second power supply circuit, and the third power supply circuit additionally fails, the failure diagnosis unit compares the amount of rotation generated by the rotation amount generating unit with the amount of rotation generated by the rotating-shaft-part rotation angle generating unit to identify a failure of one of the first sensor, the second sensor, the third sensor, the fourth sensor, the fifth sensor, and the sixth sensor.

* * * * *